United States Patent [19]

Wical

[11] Patent Number: 5,940,821
[45] Date of Patent: Aug. 17, 1999

[54] INFORMATION PRESENTATION IN A KNOWLEDGE BASE SEARCH AND RETRIEVAL SYSTEM

[75] Inventor: Kelly Wical, San Carlos, Calif.

[73] Assignee: Oracle Corporation, Redwood Shores, Calif.

[21] Appl. No.: 08/861,650

[22] Filed: May 21, 1997

[51] Int. Cl.[6] ................................. G06F 17/30
[52] U.S. Cl. ....................... 707/3; 707/4; 707/5
[58] Field of Search .................. 707/1, 2, 3, 4, 707/5

[56] References Cited

U.S. PATENT DOCUMENTS

| | | | |
|---|---|---|---|
| 4,332,014 | 5/1982 | Nakazawa et al. | 364/900 |
| 4,719,571 | 1/1988 | Rissanen et al. | 364/300 |
| 4,823,306 | 4/1989 | Barbic et al. | 364/900 |
| 4,972,349 | 11/1990 | Kleinberger | 364/900 |
| 5,159,667 | 10/1992 | Borrey et al. | 395/148 |
| 5,167,011 | 11/1992 | Priest | 395/54 |
| 5,201,404 | 4/1993 | Maki et al. | 707/3 |
| 5,257,185 | 10/1993 | Farley et al. | 364/419.19 |
| 5,276,616 | 1/1994 | Kuga et al. | 364/419.08 |
| 5,278,980 | 1/1994 | Pederson et al. | 707/3 |
| 5,307,266 | 4/1994 | Hayashi et al. | 364/419.07 |
| 5,325,298 | 6/1994 | Gallant | 364/419.19 |
| 5,347,623 | 9/1994 | Takano et al. | 395/157 |
| 5,369,763 | 11/1994 | Biles | 395/600 |
| 5,418,946 | 5/1995 | Mori | 707/3 |
| 5,434,961 | 7/1995 | Horiuchi et al. | 395/144 |
| 5,442,780 | 8/1995 | Takanashi et al. | 395/600 |
| 5,463,773 | 10/1995 | Sakakibara et al. | 707/3 |
| 5,497,489 | 3/1996 | Menne | 707/3 |
| 5,519,865 | 5/1996 | Kondo et al. | 707/3 |
| 5,535,382 | 7/1996 | Ogawa | 707/3 |
| 5,598,557 | 1/1997 | Doner et al. | 395/605 |
| 5,625,767 | 4/1997 | Bartell et al. | 395/140 |
| 5,630,117 | 5/1997 | Oren et al. | 395/602 |
| 5,630,125 | 5/1997 | Zellweger | 395/614 |
| 5,687,364 | 11/1997 | Saund et al. | 707/505 |
| 5,768,580 | 6/1998 | Wical | 707/102 |
| 5,802,504 | 9/1998 | Suda et al. | 706/11 |

OTHER PUBLICATIONS

Cox, John "'Text–Analysis' Server to Simplify Queries", Communications Week, Apr. 19, 1993 pp. 1–3.

*Primary Examiner*—Thomas G. Black
*Assistant Examiner*—Frantz Coby
*Attorney, Agent, or Firm*—Fleisler, Dubb, Meyer & Lovejoy LLP

[57] ABSTRACT

A knowledge base search and retrieval system, which includes factual knowledge base queries and concept knowledge base queries, is disclosed. A knowledge base stores associations among terminology/categories that have a lexical, semantical or usage association. Document theme vectors identify the content of documents through themes as well as through classification of the documents in categories that reflects what the documents are primarily about. The factual knowledge base queries identify, in response to an input query, documents relevant to the input query through expansion of the query terms as well as through expansion of themes. The concept knowledge base query does not identify specific documents in response to a query, but specifies terminology that identifies the potential existence of documents in a particular area.

43 Claims, 22 Drawing Sheets

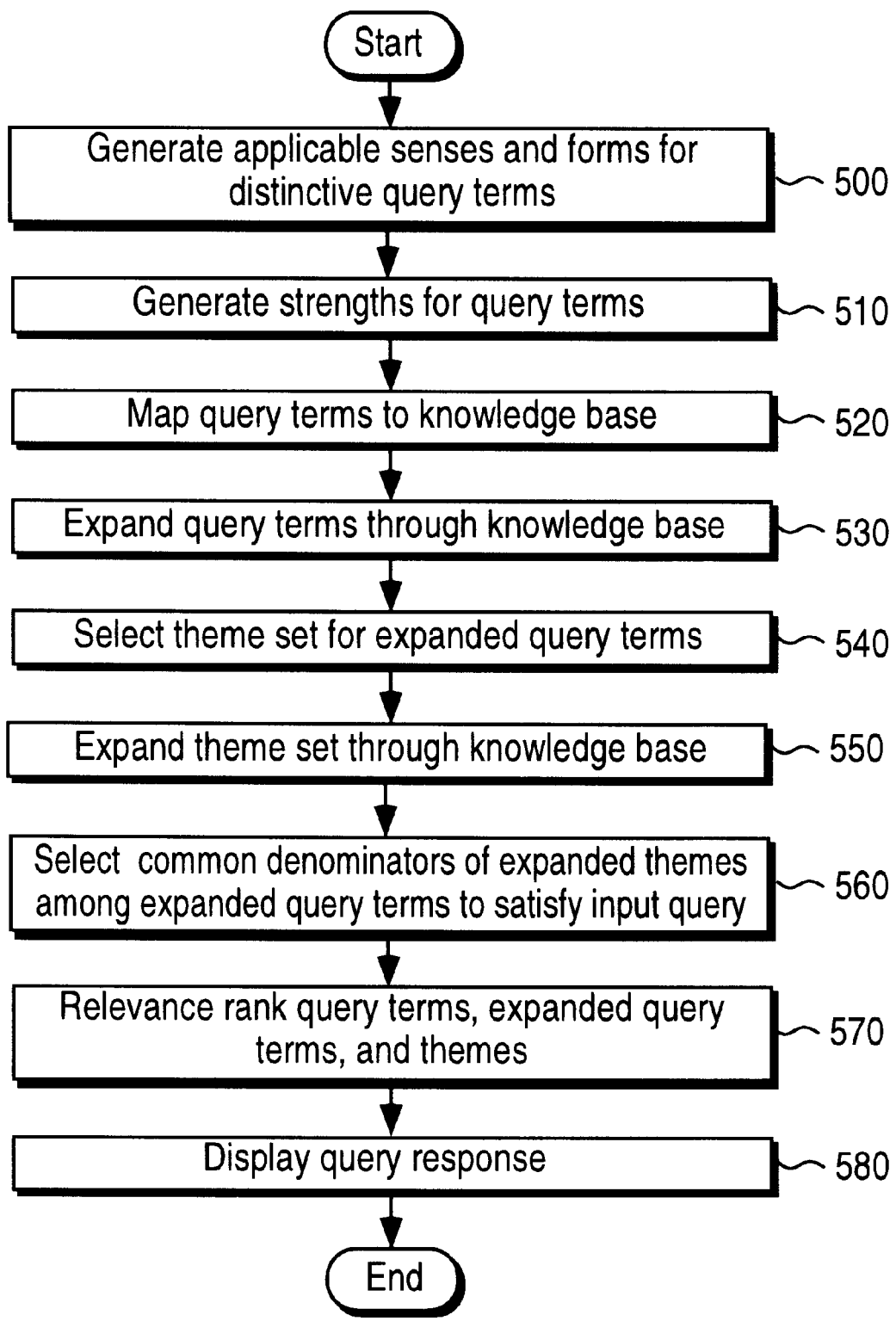

Internet

*Virtual Clerk*  Concept Search
Knowledge Search
List Topics
Help

---

Found 15 Documents and 5 Categories

☆☆☆☆ Computer Networking (15)
    ☆ Internet CreditBureau, Incorporated (0)
    ☆ Internet Fax Server (0)
    ☆ Internet Productions, Incorporated (0)
    ☆ Internet Newbies (0)

FIG. 10B

Science and Technology (2380) | Communications (279) | Telecommunications Industry (90)

Computer Networking(15)

Electronic Mail (1)
    GE Networks (1)
    Internet Technology (2)
    Messaging (1)
    NBC Networks (3)
    Networks (1)

Documents About Computer Networking and Also:

| | | | | |
|---|---|---|---|---|
| Colorado | 7/01/88 | Business Brief: Noted... | | ▨ |
| Mexican | 8/19/88 | The Americas: Mexico's... | | ▨ |
| NBC Officials | 7/05/88 | NBC Talks With European... | - New | |
| State Agencies | 10/07/88 | Three Companies Win $180... | - | |
| Television and Radio | 8/09/88 | NBC-TV Trying to Beat... | +1 | ▨ |

See Also:

Computer Hardware Industry (56)
    Computer Industry (256)
    Computer Standards (1)
    Information Technology (9)
    Mathematics (4)

FIG. 10C

Category: <u>Portfolios</u> regarding 'stocks'

---

Documents:
---

<u>Money Managers With Smaller Stocks Hold Performance Lead, Study Shows</u>

'For all managers, the typical stock portfolio showed a 14.1% gain in the first nine months of 1988, topping the 13% rise by Standard & Poor's Corp. 500-stock index, according to CDA Investment Technologies Inc., a Bethesda, Md., research firm that compiles performance data supplied by investment advisers.'

<u>These Stocks Are a Nightmare -- As S&P Climbs 21%, Some Battered Stocks Still Dash Dreams</u>

'Months ago, investors began bailing out of Genentech stock, and recently the rush for the door has been feverish; the stock is down 45% since Oct. 19.'

<u>Your Money Matters: Many Investment Strategies May Falter Because of Hidden Economic Assumptions</u>

FIG. 11A-1

Internet

𝒱𝒾𝓇𝓉𝓊𝒶𝓁 𝒞𝓁𝑒𝓇𝓀 
Concept Search
Knowledge Search
List Topics
Help

Stocks

Found 152 Documents and 64 Categories

| | | |
|---|---|---|
| ☆☆☆ | Commerce and Trade | (42) |
| ☆☆ | Companies | (13) |
| ☆☆ | Financial Investments | (8) |
| ☆☆ | Investors | (5) |
| ☆☆ | Portfolios | (3) |
| ☆ | Pharmaceutical Industry | (5) |
| ☆ | Magazines | (1) |
| ☆ | Automotive Industry | (3) |
| ☆ | Mineralogy | (3) |
| ☆ | Computer Software Industry | (4) |
| ☆ | Stocks and Bonds | (2) |
| ☆ | Food and Drink Industry | (4) |
| ☆ | Petroleum Products Industry | (1) |
| ☆ | Television and Radio | (1) |
| ☆ | New York Life Insurance Company | (1) |
| ☆ | McGraw-Hill, Incorporated | (1) |
| ☆ | Banking Industry | (2) |
| ☆ | Industrial Goods Manufacturing | (2) |
| ☆ | Texaco, Incorporated | (1) |
| ☆ | Insurance Industry | (2) |
| ☆ | Lawyers | (1) |
| ☆ | Walt Disney Company | (1) |
| ☆ | CitiCorp | (1) |
| ☆ | Diversified Companies | (2) |
| ☆ | Buys | (1) |
| ☆ | Preferred Stocks | (2) |
| ☆ | Computer Hardware Industry | (2) |

FIG. 11A-2

☆ Dun & Bradstreet Corporation (1)
☆ Health-care Companies (1)
☆ Brokers (1)
☆ Personal Finance (1)
☆ Lawsuits (1)
☆ Leveraged Buy-outs (1)
☆ Itel Corporation (1)
☆ Computer Industry (2)
☆ Aviation (1)
☆ Plastic and Rubber (1)
☆ Hard Sciences (1)
☆ Rail Transportation (1)
☆ Financial Lending (1)
☆ Chrysler Corporation (1)
☆ Gillette (1)
☆ Drugs (1)
☆ Clothing (1)
☆ Brush Wellman, Incorporated (1)
☆ Taxes and Tariffs (1)
☆ Manufacturing (1)
☆ Japanese Companies (1)
☆ Airlines (1)
☆ Cinema (1)
☆ Construction Industry (1)
☆ Automotive Service and Repair (1)
☆ Retail Trade Industry (1)
☆ Dow Chemical Company (1)
☆ Real Estate (1)
☆ Consumer Electronics (1)
☆ Chemical Industry (1)
☆ Convenience Products Businesses (1)
☆ Shares Outstanding (1)
☆ American Brands, Incorporated (1)
☆ Motorola, Incorporated (1)
☆ Package Delivery Industry (1)
☆ Masco Corporation (1)

FIG. 11B

Business and Economics (5438) | Business and Industry (2889) | Corporate Practices (263)

Portfolios (4)

◻ Documents About Portfolios and Also:

| | | |
|---|---|---|
| 🗐 Commerce and Trade | ◻ 11/16/88 Money Managers With... | - |
| 🗐 Interest Rates | ◻ 8/24/88 Your Money Matters: Many... | ▨ |
| 🗐 Investors | ◻ 10/10/88 These Stocks Are a... | ▨ |
| 🗐 Securities | ◻ 7/14/88 Fannie Mae Net Rose 97%... | ▨ |

FIG. 12

*Virtual Clerk*
Subject Location
Knowledge Search
List Topics
Help

President George Herbert Walker Bush

Appears in 28 Docs/17 Categories:

| | |
|---|---:|
| ☆☆ President George Herbert Walker Bush | (7) |
| ☆ Republican Party | (6) |
| ☆ Capital Gains Taxes | (1) |
| ☆ White House | (1) |
| ☆ President Ronald Wilson Reagan | (1) |
| ☆ Senate | (1) |
| ☆ Democratic Party | (1) |
| ☆ Iran Contra Affair | (1) |
| ☆ Congress | (1) |
| ☆ Job Actions | (1) |
| ☆ Campaigns | (1) |
| ☆ Meetings | (1) |
| ☆ Tax Rates | (1) |
| ☆ Presidential Candidates | (1) |
| ☆ Senators | (1) |
| ☆ Florida Governor | (1) |
| ☆ AIDS - Acquired Immune Deficiency Syndrome | (1) |

INFORMATION PRESENTATION IN A KNOWLEDGE BASE SEARCH AND RETRIEVAL SYSTEM

BACKGROUND OF THE INVENTION

1. Field of the Invention

The present invention is directed toward the field of search and retrieval systems, and more particularly to a knowledge base search and retrieval system.

2. Art Background

In general, search and retrieval systems permit a user to locate specific information from a repository of documents, such as articles, books, periodicals, etc. For example, a search and retrieval system may be utilized to locate specific medical journals from a large database that consists of a medical library. Typically, to locate the desired information, a user enters a "search string" or "search query." The search query consists of one or more words, or terms, composed by the user. In response to the query, some prior art search and retrieval systems match words of the search query to words in the repository of information to locate information. Additionally, boolean prior art search and retrieval systems permit a user to specify a logic function to connect the search terms, such as "stocks AND bonds", or "stocks OR bonds."

In response to a query, a word match based search and retrieval system parses the repository of information to locate a match by comparing the words of the query to words of documents in the repository. If there is an exact word match between the query and words of one or more documents, then the search and retrieval system identifies those documents. These types of prior art search and retrieval systems are thus extremely sensitive to the words selected for the query.

The terminology used in a query reflects each individual user's view of the topic for which information is sought. Thus, different users may select different query terms to search for the same information. For example, to locate information about financial securities, a first user may compose the query "stocks and bonds", and a second user may compose the query "equity and debt." For these two different queries, a word match based search and retrieval system would identify two different sets of documents (i.e., the first query would return all documents that have the words stocks and bonds and the second query would return all documents that contain the words equity and debt). Although both of these query terms seek to locate the same information, with a word search and retrieval system, different terms in the query generate different responses. Thus, the contents of the query, and subsequently the response from word based search and retrieval systems, is highly dependent upon how the user expresses the query term. Consequently, it is desirable to construct a search and retrieval system that is not highly dependent upon the exact words chosen for the query, but one that generates a similar response for different queries that have similar meanings.

Prior art search and retrieval systems do not draw inferences about the true content of documents available. If the search and retrieval system merely compares words in a document with words in a query, then the content of a document is not really being compared with the subject matter identified by the query term. For example, a restaurant review article may include words such as food quality, food presentation, service, etc., without expressly using the word restaurant because the topic, restaurant, may be inferred from the context of the article (e.g., the restaurant review article appeared in the dining section of a newspaper or travel magazine). For this example, a word comparison between a query term "restaurant" and the restaurant review article may not generate a match. Although the main topic of the restaurant review article is "restaurant", the article would not be identified. Accordingly, it is desirable to infer topics from documents in a search and retrieval system in order to truly compare the content of documents with a query term.

Some words in the English language connote more than a single meaning. These words have different senses (i.e., different senses of the word connote different meanings). Typically, prior art search and retrieval systems do not differentiate between the different senses. For example, the query "stock" may refer to a type of financial security or to cattle. In prior art search and retrieval systems, a response to the query "stock" may include displaying a list of documents, some about financial securities and others about cattle. Without any further mechanism, if the query term has more than one sense, a user is forced to review the documents to determine the context of the response to the query term. Therefore, it is desirable to construct a search and retrieval system that displays the context of the response to the query.

Some prior art search and retrieval systems include a classification system to facilitate in the location of information. For these systems, information is classified into several pre-defined categories. For example, Yahoo!™, an Internet directory guide, includes a number of categories to help users locate information on the World Wide Web. To locate information in response to a search query, Yahoo!™ compares the words of the search query to the word strings of the pre-defined category. If there is a match, the user is referred to web sites that have been classified for the matching category. However, similar to the word match search and retrieval systems, words of the search query must match words in the category names. Thus, it is desirable to construct a search and retrieval system that utilizes a classification system, but does not require matching words of the search query with words in the name strings of the categories.

SUMMARY OF THE INVENTION

A search and retrieval system displays information in response to a user query. The search and retrieval system processes the query, which includes multiple query terms, to identify groupings of topics that relate to the query terms and that appear in at least one document of a repository of documents available to the search and retrieval system. In response to the query, the groupings of topics are displayed with the query terms to identify available documents that include those topics in the corresponding grouping of topics. In one embodiment, the groupings of topics are theme groups. For this embodiment, the topics displayed identify that thematic information, corresponding to the subject matter of the topics, is available in those documents.

In one embodiment, the search and retrieval system also displays a category, for one or more documents selected, to indicate the general subject matter for a corresponding document. The documents are classified in a category of a classification hierarchy to reflect the primary subject matter of the document, and the search and retrieval systems displays the category for which a document has been classified.

In one embodiment, the groupings of topics are displayed in an order based on the importance or relevance of the groupings of topics to the query. The search and retrieval system generates the order based on: the largest number of topics in a groupings of topics; the highest total theme weight of themes in a theme group (e.g., grouping of topics); and the largest total document strength for documents displayed with the grouping of topics.

In one embodiment, the search and retrieval system displays document names in an order to reflect the documents most relevant to the query. For this embodiment, the search and retrieval system displays documents based on the total theme weight assigned to themes in a document.

The search and retrieval system also displays a response to a query relative to terminology in a knowledge base. For this embodiment, the search and retrieval system processes a query, which includes multiple query terms, to identify terminology relevant to one or more query terms, and displays the groupings of the query terms with the terminology identified. With this information, the user may identify additional areas or topics to direct the search. The groupings are displayed in an order based on: the highest number of query terms satisfied; the highest total query term weight; and the highest total theme weight for themes in a corresponding group.

The display presentation of the search and retrieval system also allows a user to learn of all senses for a query by displaying, relative to a classification system, categories that identify a particular sense for the query.

The search and retrieval system further includes a profile query to provide a profile of a subject based on a repository of information. The query is processed to identify information in the repository relevant to the subject, and to identify at least one topic that provides a context for the information identified. In response to the profile query, the search and retrieval system displays the topics to provide a profile of available information about the subject.

BRIEF DESCRIPTION OF THE DRAWINGS

FIG. 7 is a flow diagram illustrating one embodiment for processing concept knowledge base queries.

FIG. 10b illustrates another example display an example display for the query "Internet."

FIG. 11a illustrates an example display of the search and retrieval system to the query "stocks."

FIG. 11b illustrates an example display in response to the selection to the category "portfolios" from the display shown in FIG. 11a.

FIG. 12 illustrates an example display for a profile query in accordance with one embodiment of the present invention.

DETAILED DESCRIPTION OF THE PREFERRED EMBODIMENTS

Figure 1:
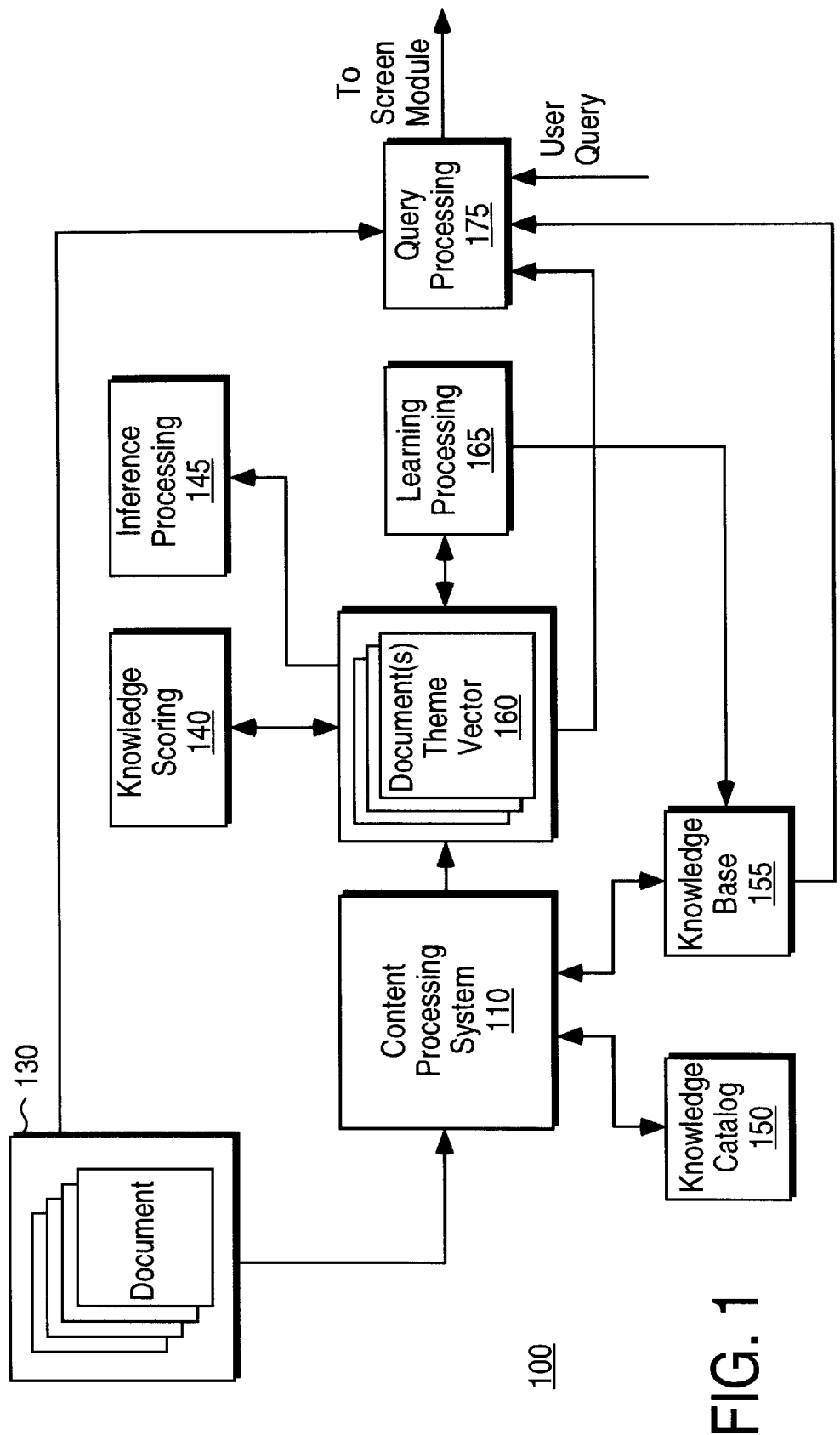
FIG. 1 is a block diagram illustrating one embodiment for the search and retrieval system of the present invention.

Search and Retrieval Paradigm:

The search and retrieval system of the present invention utilizes a rich and comprehensive content processing system to accurately identify themes that define the content of the source material (e.g., documents). In response to a search query, the search and retrieval system identifies themes, and the documents classified for those themes. In addition, the search and retrieval system of the present invention draws inferences from the themes extracted from a document. For example, a document about wine, appearing in a wine club magazine, may include the words "vineyards", "Chardonnay", "barrel fermented", and "french oak", which are all words associated with wine. As described more fully below, if the article includes many content carrying words that relate to the making of wine, then the search and retrieval system infers that the main topic of the document is about wine, even though the word "wine" may only appear a few times, if at all, in the article. Consequently, by inferring topics from terminology of a document, and thereby identifying the content of a document, the search and retrieval system locates documents with the content that truly reflect the information sought by the user. In addition, the inferences of the search and retrieval system provide the user with a global view of the information sought by identifying topics related to the search query although not directly included in the search query.

The search and retrieval system of the present invention utilizes sense associations to identify related terms and concepts. In general, sense associations relate terminology to topics or categories based on contexts for which the term may potentially appear. In one embodiment, to implement the use of sense association in a search and retrieval system, a knowledge base is compiled. The knowledge base reflects the context of certain terminology by associating terms with categories based on the use of the terms in documents. For the above example about wine making, the term "barrel fermented" may be associated with the category "wines." A user, by processing documents in the content processing system described herein, may compile a knowledge base that associates terms of the documents with categories of a classification system to develop contextual associations for terminology.

As described more fully below, the search and retrieval system of the present invention maps search queries to all senses, and presents the results of the query to reflect the contextual mapping of the query to all possible senses. In one embodiment, the search and retrieval system presents the results relative to a classification system to reflect a context associated with the query result. For example, if the user search term is "stock", the search and retrieval system response may include a first list of documents under the category "financial securities", a second list of documents under the category "animals", and a third category under the category "race automobiles." In addition, the search and retrieval system groups categories identified in response to a query. The grouping of categories further reflects a context for the search results. Accordingly, with contextual mapping of the present invention, a user is presented with different contextual associations in response to input of a search query that has more than one sense.

In one embodiment, the search and retrieval system of the present invention includes factual knowledge base queries as well as concept knowledge base queries. As described more fully below, the factual knowledge base queries identify, in response to a query, the relevant themes, and the documents classified for those themes. In contrast, the concept knowledge base queries do not identify specific documents in response to a query, but identify the potential existence of a document by displaying associated categories and themes. In essence, for the concept knowledge base query, the user learns that if documents do exist for the search query, the documents may be located under or associated with these categories and terminology for a particular context of the search query. The user may use the identified categories and terminology to locate the information in a different system. For example, the search and retrieval system may operate on a repository that includes a limited set of documents. If a user is unsuccessful in locating a document in this repository, then the categories and associated terminology learned from a concept query may be used to search a larger repository, such as the Internet.

The search and retrieval system of the present invention bridges the gap between the user's view of a description of the information sought (e.g., the search query), and the organization and classification of information in the search and retrieval system. After executing a query, the user learns how the specific search query terms chosen map to the categories in the underlying classification system utilized by the search and retrieval system. With this "bridging information", a user may learn to more effectively utilize the system.

A Search and Retrieval System:

FIG. 1 is a block diagram illustrating one embodiment for the search and retrieval system of the present invention. In general, the search and retrieval system 100 receives, as input, user queries, and generates, as output, search results which, depending upon the mode of operation, identifies categories and documents. The search and retrieval system 100 is cataloged with one or more documents, labeled documents 130 on FIG. 1. The documents 130 may include a compilation of information from any source. For example, the documents 130 may be information stored on a computer system as computer readable text. Also, the documents 130 may be accessed via a network, and stored at one or more remote locations. The content of the documents 130 may include articles, books, periodicals, etc.

In one embodiment, the search and retrieval system 100 operates in conjunction with a content processing system 110. In general, the content processing system 110 analyzes the thematic, contextual, and stylistic aspects of the documents 130, and generates a document theme vector 160. The document theme vector 160 identifies themes for each individual document, as well as a theme strength corresponding to each theme. In addition to identifying document themes, the content processing system 110 attempts to classify each theme. Specifically, the content processing system 110 uses a classification criteria, which in one embodiment includes categories arranged in a hierarchical structure, to classify document themes in one or more categories. The classifications for document themes are identified in the document theme vector 160. As discussed more fully below, the document theme vector 160 is used to process user input queries.

In one embodiment, the content processing system 110 uses a knowledge catalog 150 to identify categories for the document themes. For this embodiment, the knowledge catalog 150 contains categories, arranged in a hierarchy, that reflect a world view of knowledge. Appendix F of U.S. patent application Ser. No. 08/454,745, now U.S. Pat. No. 5,694,523, inventor Kelly Wical, entitled "Content Processing System for Discourse", filed May 31, 1995, which is herein expressly incorporated by reference, is an example of a knowledge catalog for use in classifying documents. Although the present invention is described in conjunction with a knowledge catalog used to classify documents, any classification criteria that identifies topics or categories may be used in conjunction with the present invention without deviating from the spirit or scope of the invention.

The search and retrieval system 100 utilizes a knowledge base, labeled 155 on FIG. 1. In general, the knowledge base 155 includes a hierarchy of categories and terminology, based on the arrangement of categories in the knowledge catalog 150, augmented to include contextual information (e.g., associations) learned from processing the documents and manually noted by linguists. In one embodiment, the knowledge base 155, packaged as a commercial product, may contain classification and contextual information based on processing and/or compilation of thousands of documents. The search and retrieval system 100 permits a user to subsequently augment the classification and contextual information through content processing of the documents input by the user. The contents, generation and use of the knowledge base 155 is described more fully below in section "The Knowledge Base."

The content processing system 110, used in conjunction with the search and retrieval system 100, is described more fully below in the section entitled "A Content Processing System." Although the present invention is described in conjunction with the content processing system 110 which analyzes documents to provide a rich and comprehensive thematic profile and classification of the documents, any content processing system that identifies topics to classify themes or terminology of documents may be used in conjunction with search and retrieval system 100 without deviating from the spirit or scope of the invention.

As shown in FIG. 1, learning processing 165 accesses and updates (as designated by the double headed arrow) the document theme vector 160. In general, learning processing 165 identifies categories for terms/themes in the document theme vector 160 for which themes/terms were not previously classified. For example, the document theme vector 160 may include the term "Oracle 7." The term "Oracle 7", a proper noun, was not classified in the content processing system 110 due to insufficient data (e.g., the context of the term was not determined in that stage of processing). For this example, the learning system analyzes categories classified for documents that contain the term "Oracle 7." From this analysis, the learning processing 165 determines that the term "Oracle 7" relates to computer software, and more particularly to relational databases. After associating or learning a category for a term previously unclassified, the learning processing 165 updates the document theme vector 160 to include the newly learned categories. Accordingly, the learning processing 165 disambiguates the context of a term by assigning a category for terms and themes previously unclassified. U.S. patent application Ser. No. 08/655,957, inventors Kelly Wical and James Conklin, entitled "A Learning System For Classification Of Terminology", filed May 31, 1996, which is herein expressly incorporated by reference, discloses techniques for learning terminology in accordance with one embodiment for the learning processing 165. An overview for learning processing is contained below in the section entitled "A Learning System."

The search and retrieval system 100 further includes knowledge scoring 140 and inference processing 145 to further refine the contents of document theme vector 160. As discussed above, the document theme vector 160 includes a list of themes for a document to define the content of that document. Thus, the document theme vector 160 lists all of the themes for a corresponding document identified after the initial content processing. However, a document may have one or more associated themes that were not identified after the initial content processing stage. In one embodiment, the content processing system identifies themes from terminology used in the document. However, a document may have a theme without ever expressly stating words that connote the theme. For example, a restaurant review column may consist of words that are typically associated with a restaurant, such as food quality, meal presentation, service, etc. Although the central theme of the restaurant review column is restaurant, the column may not include the term "restaurant." For the reader of the original restaurant review column, the central theme of "restaurant" may be implied from the magazine or newspaper publication (e.g., the column appears in the restaurant review section of the paper, or in a food magazine.) The inference processing 145 infers themes even though terminology is not explicitly included in the document. For the example document on restaurant reviews, the inference processing 145 adds the theme "restaurants" to the document theme vector 160 for that document. Accordingly, the inference processing 145 infers categories based on terminology in the document.

Knowledge scoring 140, which also operates on the document theme vector 160, reassigns theme strengths based on the contextual relationship among themes identified for the document. For example, for the above example restaurant review document, the inference processing 145 inferred the category "dining and restaurants." In a subsequent process, the knowledge scoring 140 adjusts the theme strengths for "dining establishments" if several of the themes support the general topic of dining establishments. Accordingly, knowledge scoring 140 is an additional process that adjusts the theme strengths based on the relationships among previously identified themes for that document.

As shown in FIG. 1, the search and retrieval system 100 includes query processing 175. The query processing 175 receives, as input, user queries, and generates, as output, responses to queries based on the mode of operation. The query processing 175 accesses documents 130, document theme vector 160, and knowledge base 155 to formulate a response to the user query.

Table 1 is an example document theme vector 160.

TABLE 1

Document Theme Vector

| Document Themes | Theme Strength | Classification Category |
|---|---|---|
| Theme$_1$ | 190 | (category$_a$) |
| Theme$_2$ | 110 | None |
| Theme$_3$ | 70 | (Category$_c$) |
| Theme$_4$ | 27 | (Category$_d$) |
| . | . | . |
| . | . | . |
| . | . | . |
| Theme$_n$ | 8 | (Category$_z$) |

As shown in Table 1, a document theme vector 160 for a document includes a list of document themes, indicated in Table 1 by Theme$_1$–Theme$_n$. Each theme has a corresponding theme strength. The theme strength is calculated in the content processing system 110. The theme strength is a relative measure of the importance of the theme to the overall content of the document. For this embodiment, the larger the theme strength, the more important the theme is to the overall content of the document. The document theme vector 160 lists the document themes from the most important to the least important themes (e.g., theme$_1$–theme$_n$).

The document theme vector 160 for each document further includes, for some themes, a category for which the theme is classified. The classification category is listed in the third column of the document theme vector shown in Table 1. For example, theme$_1$ is classified in category$_a$, and theme$_3$ is classified in category$_c$. Note that for this example, theme$_2$ is not classified in a category after the content processing stage, (i.e., a specific category or context for theme$_2$ was not identified). As explained more fully below, the learning processing 165 attempts to learn the context of themes and terminology not previously classified.

Figure 2:
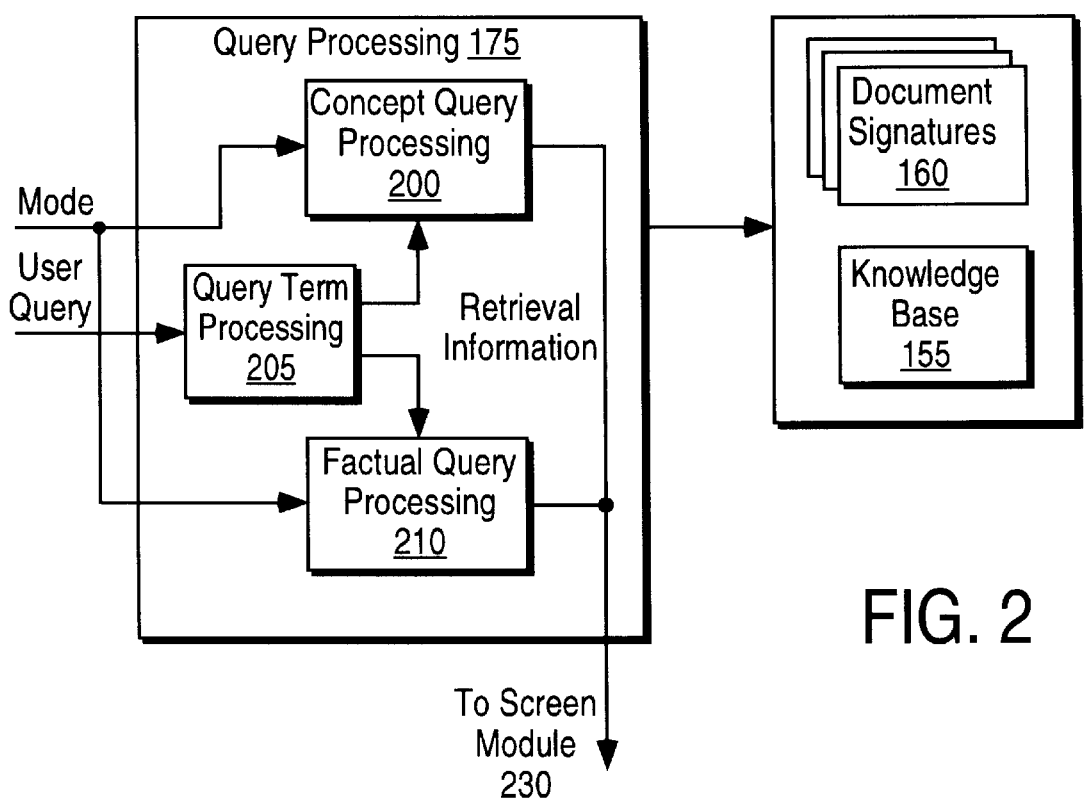
FIG. 2 is a block diagram illustrating one embodiment for query processing.

Query Term Processing:

FIG. 2 is a block diagram illustrating one embodiment for query processing. As shown in FIG. 2, the query processing block 175 receives user query and mode information. The mode information selects between a concept knowledge base query (concept query), a document or factual knowledge base query (factual query), or a profile query. A query term processing block 205 divides the query into distinct parts. Different senses are then generated for each part of the query. Typically, words in a query consist of nouns, adjectives, adverbs, and verbs. If the input query consists of an adjective, adverb or verb, then the query term processing 205 converts the query term to a nominal form. For example, the verb "to fish" is converted to "fishing", and the verb "performing" is converted to "performance." If the input query term consists of a noun, then the term is in the proper form for reference to the knowledge base 155.

The query term processing 205 further analyzes query terms to determine whether a noun query term has a mass sense and/or a count sense. For example, the word "baseball", which is the mass sense of the word, has a completely different meaning than the count sense "baseballs." If the word has both a mass sense and a count sense, then the query term processing 205 references both the mass sense and count sense to the knowledge base 155 (i.e., both the mass sense and the count sense are used in query processing).

The noun form of a word may have a different meaning than the nominal form of the word. For example, the noun form of "fish" has a different meaning than the nominal form "to fish", which refers to the act of fishing. When applicable, the query term processing 205 references both the noun and the nominal form to the knowledge base 155. Because the noun sense of a word may be different than the nominal sense, and the mass sense may be different than the count sense, a separate classification exists for nominal and noun forms as well as for mass and count senses in the knowledge base 155. Accordingly, the query term processing 205 generates, when applicable, the noun form, the nominal form, the mass sense, and the count sense for each part of the input query.

As shown in FIG. 2, the query parts, including the different senses, are input to the concept query processing 200 and factual query processing 210 blocks. The mode selects either the concept query processing 200 or factual query processing 210.

In one embodiment, the query term processing 205 further includes processes for case sensitivity. In general, the process of matching query terms to knowledge base 155 entries is a case sensitive process. For example, if the query term is "Oracle", then, for a match, a knowledge base 155 category/ term must include "Oracle." Thus, the entry "oracle" would not match the query term "Oracle." This example illustrates a case sensitive matching system.

The query term processing 205 includes processes to eliminate the case sensitivity problem, when appropriate. The content processing system 110 (FIG. 13) includes a lexicon 760. The lexicon 760 contains information (e.g., definitional characteristics) for a plurality of words. One definitional characteristic defines the part of speech for the corresponding word. For example, the lexicon 760 identifies whether a word is a common noun. Furthermore, the lexicon 760 identifies the amount of content carrying information for a corresponding word. In general, the query term processing 205 utilizes the definitional characteristics in the lexicon to determine whether to generate a lower case term from an upper case term when input as a query term. In one embodiment, the query term processing 205 generates lower case terms if the corresponding upper case term is both a common noun and a content carrying word. Names, which are proper nouns, are not converted. For query terms converted, both the upper case term and the lower case term are used to process the query. Although certain upper case terms are converted to lower case terms, the original upper case query term is considered more relevant to the original query than the lower case term.

As described fully below, the concept query processing 200 and factual query processing 210 reference the knowledge base 155 and document theme vectors 160 to generate a response to the user query. The query processing block 175 outputs retrieval information to a screen module 230. In general, the screen module 230 processes the retrieval information to display the retrieval information in a predetermined form. Embodiments for displaying retrieval information are shown in FIGS. 3, 10a, 10b, 11a, 11b, 11c and 12. A screen module, such as screen module 230, which processes information for display on a computer output display, is well known in the art and will not be described further.

Figure 3:
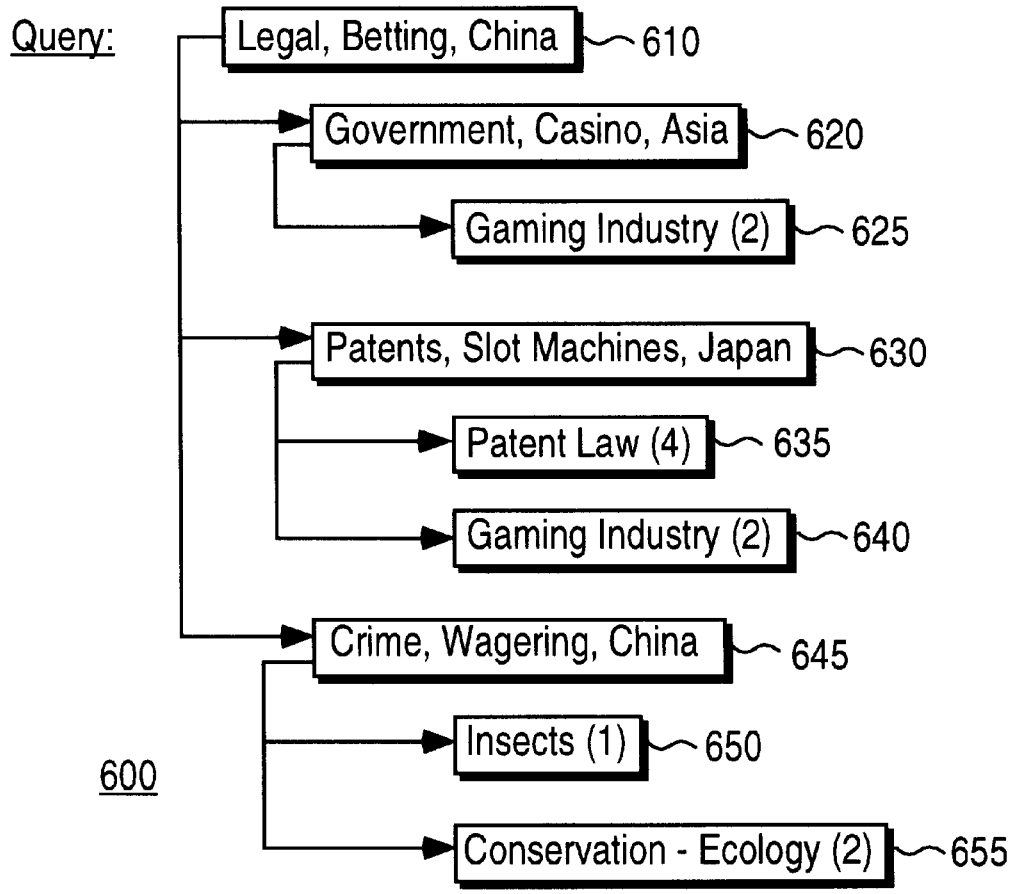
FIG. 3 illustrates a response to an example query configured in accordance with one embodiment of the search and retrieval system of the present invention.

Search and Retrieval Information Presentation:

FIG. 3 illustrates a response to an example query configured in accordance with one embodiment of the search and retrieval system. The example query, shown in block 610 in FIG. 3, includes the query terms "Legal", "Betting", and "China." With this query, the user wants to learn about the legal aspects of betting in China. In response to the query, the search and retrieval system 100, utilizing the knowledge base 155, identifies terminology related to the query terms. Specifically, for this example, the search and retrieval system 100 identifies terminology shown in blocks 620, 630, and 645 of FIG. 3. In general, the knowledge base 155 is used to identify terminology that has a lexical, semantic, or usage association with the query terms. For this example, the knowledge base 155 indicates that the query term "legal" has a sense association with the terms "government", "patents", and "crime." For the query term betting, the knowledge base 155 identifies the terms "casino", "slot machines", and "wagering." Furthermore, a sense association is identified between the terms "Asia" and "Japan" and the query term "China."

As shown in the example of FIG. 3, the search and retrieval system groups terms related to the query based on information identified. For this example, the search and retrieval system 100 identified information in two documents that included the topics "government", "casino", and "Asia." For the second entry, the search and retrieval system 100 identified six documents that included topics on "patents", "slot machines", and "Japan." Furthermore, there were three documents that included information on the topics "crime", "wagering", and "China."

The presentation of information example of FIG. 3 shows the groupings of terminology related to the query term that satisfies each term of the query request. In one embodiment, the groupings of terms reflects that the documents contain themes that were classified for those terms. For example, the two documents under the grouping "government, casino, Asia", include at least one theme classified in a category (or subcategory) about government, casinos, and Asia.

The response to a multiple term query may also identify groupings that relate to less than all of the query terms. For example, if the two documents related to the terms "government", "casino", "Asia" did not include a theme classified, or subclassified, under the category Asia, then a grouping of the terms "government and casino" would be displayed. Accordingly, the search and retrieval system presents the most relevant groupings of terms that include information contained in the documents.

For the embodiment shown in FIG. 3, the documents, which include information on the corresponding terms, are presented relative to a classification system. For the grouping of terms "government, casino, Asia", encompassed in block 620, two documents were classified in the category "gaming industry", as shown in block 625. Although the two documents contain information, or themes, about the terms "government, casino, Asia", these two documents were classified in the category "gaming industry", thereby indicating that the two documents are primarily about the gaming industry. The categories displayed in response to a query permit a user to view the main or central topic of the documents having material on the corresponding terms. As shown in blocks 635 and 640, respectively, four documents were classified under the category "patent law", and two documents were classified under the category "gaming industry." As shown in blocks 650 and 655, one document was classified in the category "insects", and two documents were classified under the category "conservation and ecology." Accordingly, the display of categories in the response to a query alerts the user to the general or most important topic of the documents identified.

The example presentation shown in FIG. 3 provides a global view of the response to the users query. The terms, associated with the query terms, (e.g., blocks 620, 630, and 645), allow the user to visualize groupings of topics located in response to the query. As shown in block 630 of FIG. 3, the search and retrieval system located documents that cover information about patents, slot machines, and Japan. At a simple glance, the user may determine whether the documents located are about the general subject matter for which the user seeks to locate information. For this example, the user may seek information about illegal betting on insects in China. Although the documents that include information on patents, slot machines and Japan is relevant to the search query, (e.g., legal, betting, China), the user is immediately alerted that these documents do not contain material on illegal betting on insects in China. Instead, the terms "crime, wagering, China" immediately steer the user to documents about illegal wagering in China. In addition, the presentation of documents relative to categories of a classification system permits the user to identify the document that is primarily about insects. Thus, because the user has a global view of the query response, the user may immediately identify documents most pertinent to the area for which information is sought. For this example, if the user seeks information on illegal betting in China, then the user is directly steered to the document classified under the category "Insects" and under the topic group of "Crime", "Wagering", and "China."

Accordingly, the search and retrieval system 100 first displays a global view of the response to the query. Thus, the user may focus on the area for which the user seeks information by obtaining a specific context for the query from the presentation of the topic groupings (e.g., 620, 630 and 645). With this response presentation, the user is not required to read a document identified in the query response to determine the overall relevance of the document to the specific information sought by the user. Once the user identifies specific information of interest, the user selects one or more documents by selecting (e.g., double clicking with a cursor control device) the category (e.g., 625, 635, 640, 650, and 655) of interest. For the above example, if the user sought information concerning the illegal betting on insects in China, then the user would select the single document classified under the category "Insects", labeled 650 on FIG. 3, to view the document contents.

Figure 4:
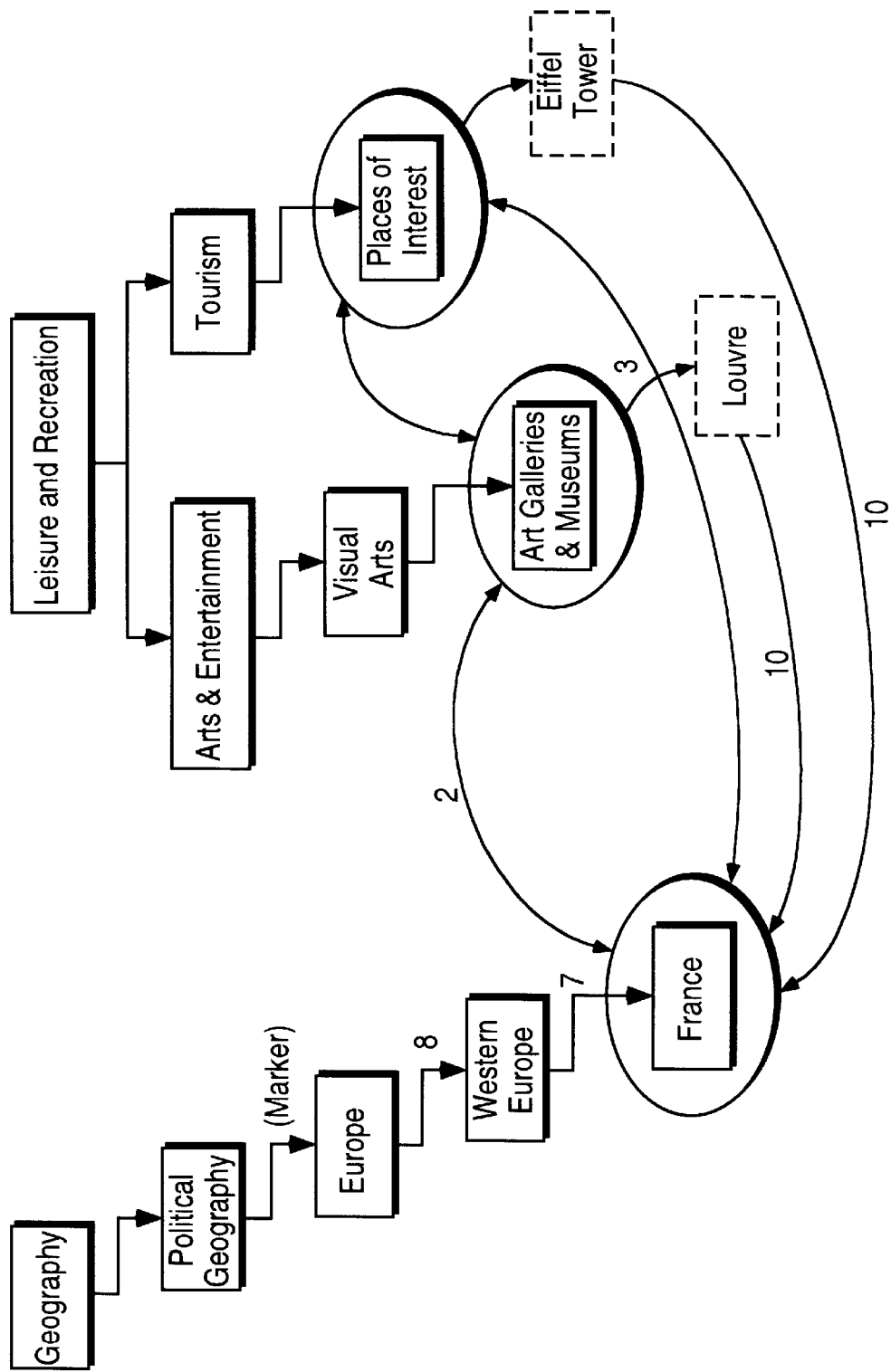
FIG. 4 illustrates an example portion of a knowledge base that includes a directed graph.

Knowledge Base:

The knowledge base 155 contains classification categories or topics, such as the knowledge catalog 150, augmented with additional terminology including cross references and links among terminology/categories. FIG. 4 illustrates an example portion of a knowledge base augmented to include additional terminology as well as cross references and links among categories and terms. The classification hierarchy and notations shown in FIG. 4 illustrate an example that classifies a document on travel or tourism, and more specifically on traveling to France and visiting museums and places of interest. As shown in FIG. 4, the classification categories (e.g., knowledge catalog 150) contains two independent static ontologies, one ontology for "geography", and a second ontology for "leisure and recreation." The "geography" ontology includes categories for "political geography", "Europe", "Western Europe", and "France." The categories "arts and entertainment" and "tourism" are arranged under the high level category "leisure and recreation." The "visual arts" and the "art galleries and museums" are subcategories under the "arts and entertainment" category, and the category "places of interest" is a subcategory under the category "tourism."

The knowledge base 155 is augmented to include linking and cross referencing among categories for which a linguistic, semantic, or usage association has been identified. For the example illustrated in FIG. 4, the categories "France", "art galleries and museums", and "places of interest" are cross referenced and/or linked as indicated by the circles, which encompass the category names, as well as the lines and arrows. This linking and/or cross referencing indicates that the categories "art galleries and museums" and "places of interest" may appear in the context of "France."

The knowledge base 155 includes terminology classified or associated with categories. For the example shown in FIG. 4, the terminology includes "Louvre" and "Eiffel Tower." For this example, the knowledge base 155 indicates that the Louvre, a proper noun, is classified under the category "art galleries and museums", and further associates the term "Louvre" to the category "France." Similarly, the knowledge base 155 indicates that the term "Eiffel Tower" is classified under the category "places of interest", and is also associated with the category "France."

The knowledge base 155 may be characterized, in part, as a directed graph. The directed graph provides information about the linguistic, semantic, or usage relationships among categories and terminology. The "links" and "cross references" on the directed graph, which indicate the associations, is graphically depicted in FIG. 4 using lines and arrows. For the example shown in FIG. 4, the directed graph indicates that there is a linguistic, semantic, or usage association among the concepts "France", "art galleries and museums", and "places of interest."

In one embodiment, the knowledge base 155 includes two types of associations: cross references and links. The cross reference associations are predetermined (e.g., prior to document processing) by a linguist. In general, the linguist develops cross reference associations when two terms/categories have a strong linguistic, semantic, or usage relationship. For example, a linguist may generate a cross reference association to denote the strong association between the term "Eiffel Tower" and the category "France." The second type of association in the knowledge base, links, are generated through processing documents. For example, if documents processed to develop the knowledge base 155 included thematic information relating "art galleries and museums" to "France", then a link, associating the categories "France" and "art galleries and museums", may be developed as described more fully below. When utilizing the knowledge base 155 to process queries, the distinction between a link association and cross reference association is made as described more fully below.

The links and cross references on the knowledge base 155 directed graph further include distance weights. In general, the distance weights provide a quantitative value to indicate the strength of the linguistic, semantic, or usage relationship between two categories/terms. FIG. 4 also shows distance weights directly above the links and cross references for a corresponding association. In one embodiment, associations have distance weights ranging from 1–10. For this embodiment, the knowledge base 155 generates one distance point or weight for each one hundred linguistic, semantic, or usage associations identified during processing in the content processing system 110. For example, the link association between the categories "France" and "art galleries and museums" was developed by the processing of at least two hundred documents that associated "art galleries and museums" with "France" (e.g., "art galleries and museums" were discussed in the context of "France."). Two strong associations (e.g., 10 distance points or weights), define the associations between both "Eiffel Tower" and "Louvre" with "France." The ten distance weights indicate that at least one thousand documents associated the terms "Eiffel Tower" and "Louvre" with "France." Thus, the distance weights indicate the strength of a corresponding linguistic, semantic, or usage relationship between two categories/terms. The distance weights are also shown among the categories, including the distance between a child category, such as "visual arts", and its parent category, "arts and entertainment."

In one embodiment, the knowledge base 155 further includes association markers. In general, the association markers indicate that the linguistic, semantic or usage association between the child category and the parent category is too weak to generalize. For the example portion of a knowledge base shown in FIG. 4, distance weights are shown to generalize from the child category, "France", to its parent category "Western Europe." Similarly, there is a high or strong distance weight to go from the child category "Western Europe" and its parent category "Europe." However, between the child category "Europe" and its parent category "Political Geography", the knowledge base 155 includes a marker. The marker indicates that "Europe" should not be generalized to "Political Geography" when developing associations with the directed graph (e.g., knowledge base). A discussion of using the knowledge base 155 to analyze associations is described more fully below.

In one embodiment, the accumulated relationships, which define the distance weights, are generated using the document theme vectors 160. As discussed above, a document theme vector 160 indicates themes identified for a corresponding document. For this embodiment, an association link is defined if a document theme is classified in the corresponding category. For example, the document theme "Louvre" was contained in at least one thousand documents that were classified in the category "France" (e.g., the documents were primarily about France but included thematic information about the Louvre).

Factual Knowledge Base Queries:

In one embodiment, query terms or query phrases are processed to identify the thematic content of terms of the input queries. In general, query term processing involves analyzing the query phrase or terms to determine the most important thematic information in the query terms. In one embodiment, the query processing assigns or generates a query strength to each term, wherein the query strength indicates the relative thematic importance among terms or words in the query. For example, a user may input to the search and retrieval system 100 the phrase "pollution caused by European space stations." For this example, the query processing analyzes the input query to determine that the terms "pollution" and "space stations" are the most important, followed by the term "Europe." The term "cause" receives a much lower query term strength, and the word "by" is completely eliminated for purposes of analysis.

Figure 5:
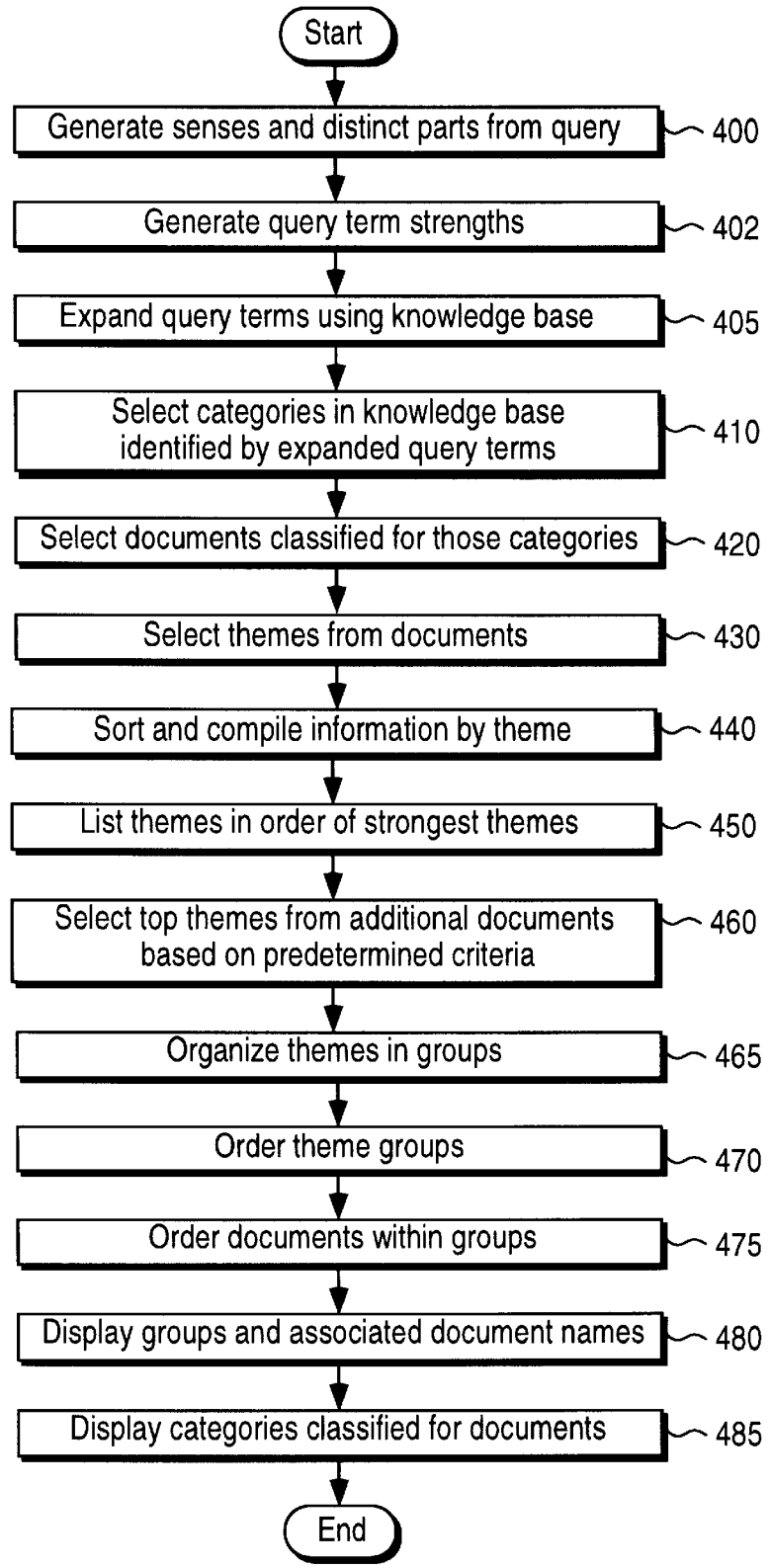
FIG. 5 is a flow diagram illustrating one embodiment for factual knowledge base query processing.

As discussed above, the factual knowledge base query processing retrieves documents, based on the user query, and displays a listing of the documents relative to a classification criteria (e.g., categories). FIG. 5 is a flow diagram illustrating one embodiment for factual knowledge base query processing. The input query is divided into distinct parts, and for each part, the query term processing 205 generates the different possible senses and forms as discussed above. This operation is shown in block 400 of FIG. 5.

As shown in block 402, query term strengths are generated for the distinct parts and senses of the query. In one embodiment, to generate the query term strengths, the query processing utilizes a lexicon that includes a corresponding strength for each word. The query strengths indicate the amount of thematic information that the word conveys relative to other words. For example, the noun "class" by itself conveys little thematic information. To the contrary, a global identifier, such as the term "biology", conveys large amounts of thematic information because the word directs or orients a reader to a specific topic. The use of query term strengths is discussed more fully below.

Figure 6:
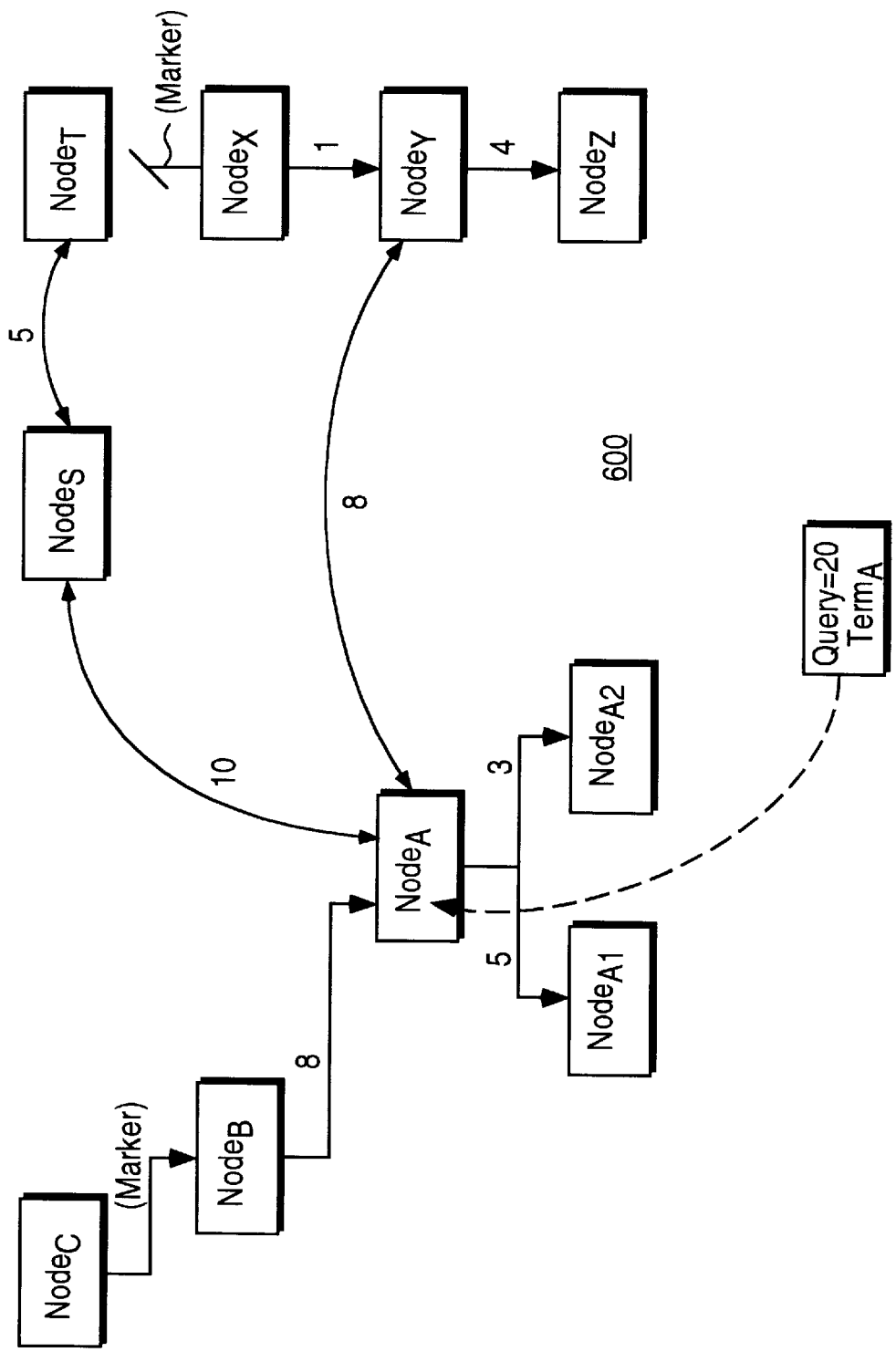
FIG. 6 illustrates one embodiment for expanding query terms using a directed graph of the knowledge base.

The knowledge base is used to expand the query terms to identify an expanded set of query terms as shown in block 405 of FIG. 5. In general, the query terms are mapped to categories in the knowledge base. The directed graph of the knowledge base is then used to identify relevant categories/terms to expand the query term set to include related categories/terms. FIG. 6 illustrates one embodiment for expanding query terms using the knowledge base. Specifically, FIG. 6 shows a portion of a generalized directed graph that includes a plurality of categories/terms with related categories/terms.

As shown in FIG. 6, a query $term_A$, which has a query term strength of 20, is mapped directly into $node_A$ on directed graph 600. For example, query $term_A$ may be the term "pollution", and $node_A$ may be the category "pollution." For this example, $node_A$ is part of a classification hierarchy that includes, as parent categories, $node_B$ and $node_C$. $Node_{A1}$ and $Node_{A2}$ are child categories/terms classified under the $node_A$ category. As shown by the double headed arrows in FIG. 6, $node_A$ has an association with $node_S$ as well as an association with $node_Y$. $Node_Y$ is part of a classification hierarchy that includes $node_X$, as the parent category, and $node_Z$ as a child category.

In general, to expand query terms using the knowledge base, the levels or tiers of the classification hierarchy as well as the knowledge base associations are used to select nodes within a predefined criteria. In one embodiment, the query term strength is decreased based on the distance weight, and all nodes with a resultant query term weight greater than one are selected. Specifically, query term weights are decreased by 50% for each point of semantic distance when expanding either to a more general category (e.g., to a parent category), or to an association. All child categories and terms beneath a node are selected. For the example shown in FIG. 6, $node_{A1}$ and $node_{A2}$ are selected. To expand up the classification hierarchy from $node_A$ to $node_B$, the query $term_A$ strength 20 is reduced 50% for each semantic distance point below 10. With a semantic distance weight of 8, the query $term_A$ strength of 20 is reduced to a query term strength of 5. In an attempt to expand even further up the classification hierarchy, $node_C$ is considered. However, the link between parent $node_C$ and child $node_B$ includes a marker; thus, $node_C$ is not selected in the expanded query term set. The association between $node_A$ and $node_Y$, which has a semantic distance weight of 8, results in the selection of $node_Y$ (e.g., query $term_A$ strength 20 is reduced to 5). $Node_Z$, a child node of $node_Y$, is selected because $node_Z$ is more specific (e.g., a lower level of the classification hierarchy). To determine whether to select $node_X$, the query term strength at $node_Y$, 5, is reduced by 50% per semantic point. With a semantic weight of 1, the query $term_A$ strength is reduced to a value below 1, and therefore $node_X$ is not selected.

$Node_S$, linked to $node_A$, is selected because the semantic distance weight of 10 does not reduce the query $term_A$ weight below 1. Finally, $node_T$ is not selected because the query $term_A$ strength of 20 is reduced below 1. Accordingly, for the example shown in FIG. 6, the expanded query term set for query $term_A$ is categories/terminology corresponding to $node_A$, $node_B$, $node_{A1}$, $node_A$, $node_Y$, $node_Z$, and $node_S$.

In one embodiment, when expanding the query terms through associations other than directly through an ontology hierarchy, the factual query processing 210 distinguishes between cross reference associations and link associations. For cross reference associations (e.g., associations generated manually by a linguist), only one reference is required to select the category/term as an expanded query term. For the example directed graph illustrated in FIG. 6, if the association between node$_A$ and node$_Y$ is a cross reference association, then this single reference is sufficient to include nodes as an expanded query term. However, for link associations (e.g., associations generated through document processing), two references are required to select the category/term as an expanded query term. For the example directed graph illustrated in FIG. 6, if the association between node$_A$ and nodes is a link association, then an additional reference, such as a reference through a different query term, is required to include nodes as an expanded query term.

For each category/term in the expanded query term set, the process selects documents classified for those categories as shown in block 420 of FIG. 5. Tables 2–4 contain data for an example of factual knowledge base query processing. Table 2 includes two columns.

TABLE 2

| Documents | Themes |
|---|---|
| 1 | $T_{1(01)}-T_{1(16)}$ |
| 2 | $T_{2(01)}-T_{2(16)}$ |
| 3 | $T_{3(01)}-T_{3(16)}$ |
| 4 | $T_{4(01)}-T_{4(16)}$ |

The first column, labeled documents, lists the documents classified for categories in the expanded query term set. The second column, labeled themes, includes a list of themes contained in a corresponding document. For this example, four documents were classified for the categories in the expanded query term set. The themes are selected from the documents as shown in block 430 of FIG. 5. For the embodiment shown in FIG. 1, the factual knowledge base query processing extracts the themes for each document from the document theme vector 160. In one embodiment, the content processing system 110 identifies 16 of the most important themes, and therefore each document listed in Table 2 includes 16 themes.

As shown in block 440, the themes are sorted and compiled. Table 3 shows a portion of the themes of Table 2 sorted for an example search about France. Table 3 consists of a column for themes, and a column for documents that include the corresponding themes. For this example, information on "wine" is found in documents 1, 2, and 4. Information on "cheeses" was identified in documents 1 and 3, and information on "impressionism" was identified in documents 1, 3, and 4. Also, information on "chateaus" was identified in document 2. The "wine" theme has a theme strength of 170 in document 1, a theme strength of 60 in document 2, and a theme strength of 90 in document 4.

TABLE 3

| Themes | Documents (4) | Theme strengths |
|---|---|---|
| Wine | 1, 2, 4 | 170, 60, 90 |
| Cheeses | 1, 3 | 110, 60 |
| Impressionism | 1, 3, 4 | 125, 170, 4 |
| Chateaus | 2 | 20 |

After the sorting of themes, the themes are listed in the order of the strongest themes as shown in block 450 of FIG. 5. Table 4 shows the listing of the themes of Table 3 based on the strongest themes.

TABLE 4

| Themes | Documents | Theme Strengths |
|---|---|---|
| Wine | 1, 2, 4 | 170, 60, 90 |
| Impressionism | 1, 3, 4 | 125, 170, 4 |
| Cheeses | 1, 3 | 110, 60 |
| Chateaus | 2 | 20 |

In one embodiment, to order the themes, the theme identified in the most documents is considered the strongest theme. If themes have the same number of documents, then the total theme strength, calculated for each document in which the theme appears, is used to identify the strongest theme (e.g., the strongest theme is the theme with the highest total theme strength from all the documents). As shown in Table 4, "wine" and "impressionism" were both identified in three documents. "Wine", having a total theme strength of 320 (e.g., 170+60+90), has a greater total theme strength than "impressionism", having a total theme strength of 299. "Cheeses", being identified in two documents, is listed as the third strongest theme, and "chateaus", which was identified in only a single document, is identified as the fourth strongest theme.

As shown in block 455 of FIG. 5, the process selects the top themes based on a predetermined criteria. For one embodiment, the process selects themes based on a predetermined number of themes or based on a minimum total theme strength. For this example, the factual knowledge base query processing selects only themes identified for more than one document. Thus, "chateaus" is eliminated.

Based on the themes selected, the factual knowledge base query processing selects all documents that include at least one theme from the theme set as shown in block 460 of FIG. 5. For the example shown in Table 4, documents that include themes for "wine", "impressionism" and "cheese" are selected. The documents are identified by the document theme vector 160. The themes, identified in the new document set, are organized in groups as shown in block 465. Table 5 shows the expanded set of themes organized in groups for the above example.

TABLE 5

| Theme Group | Documents |
|---|---|
| A) Wine, Cheeses | 1, 4, 16, 20, and 36 |
| B) Mardi Gras, Foods, Wine | 1, 17, 24, and 27 |
| C) Cheeses, Brie | 1, 20, 36 |
| D) Wine, Burgundy, Bordeaux | 9 and 21 |
| E) Impressionism, Monet | 7 |

For the above example, several theme groups, listed in the column labeled "theme group", were identified. The second column, labeled "documents", identifies documents for which the corresponding theme groups appear. For example, themes on wine and cheeses (theme group A) appear in documents 1, 4, 16, 20 and 36.

As shown in block 470 of FIG. 5, the theme groups are ordered. In one embodiment, the first criteria used to order the theme groups is the number of themes in each group. For the example theme groups shown in Table 5, theme group B and theme group D, both with 3 themes, are ranked first, and theme group A, theme group C, and theme group E, each with two themes, are ranked second. If two or more theme groups contain the same number of themes, (e.g., theme group B and theme group D) then the group with the highest total theme weight or strength is the next criteria. For the example shown in Table 5, if theme group B has a total theme weight greater than theme group D, then theme group B is displayed. However, if two or more theme groups contain the same total theme strength, then the theme group with the greatest total document strength, for the documents identified, is ranked first. The theme groups displayed in response to a query indicate the different contexts for the query. For the above example, themes "wine" and "cheeses" indicate one context for the query, and themes "impressionism" and "Monet" indicate a second, etc.

The factual knowledge base query processing then dispatches, to the screen module 230, the retrieved theme groups and associated document name for display on an output display as shown in block 480 of FIG. 5. In one embodiment, in addition to displaying the theme groups and associated document names, the search and retrieval system 100 displays categories classified for the documents displayed as shown in block 485. Example displays for one embodiment of the search and retrieval system of the present invention is described more fully below in conjunction with FIGS. 10a, 10b, 11a, 11b, and 11c.

As shown in block 475 of FIG. 5, in one embodiment, the documents, within a theme group, are relevance ranked such that the documents are ordered from the most relevant of the theme group to the least relevant of the theme group. In one embodiment, the documents, listed under a particular theme group, are relevance ranked in accordance with the weight of the corresponding themes. For the theme group A example shown in Table 5, if the themes wine and cheeses have the highest associated weight or strength in document 16, then document 16 is listed first under theme group A.

In one embodiment, the search and retrieval system 100 utilizes a relevancy system. The relevancy system displays, where appropriate, stars next to a category name to indicate the general relevancy of the category to the query term. For example, four stars displayed next to a category or theme group indicates that the theme group or category is extremely relevant to the input query. In one embodiment, the number of stars, which indicate the general relevancy of the category to the search term, is calculated based on total weights for the query. The range of possible total weights are divided into four ranges, such that four stars indicates the highest range, three stars indicate the second highest range, two stars indicates the second lowest range, and one star indicates the lowest range.

Concept Knowledge Base Queries:

As discussed above, the concept knowledge base queries provide the user a list of categories and terms associated with the input query. The response is not particular to a specific document set. FIG. 7 is a flow diagram illustrating one embodiment for processing queries for a concept knowledge base query. In response to a query input and selection of the concept knowledge base query mode, the input query is divided into distinct parts, and all applicable senses and forms for each distinct query part are generated as shown in block 500. Also, the query term weights or strengths for each query term are generated as shown in block 510.

As shown in block 520, the query terms are mapped to the knowledge base (i.e., the query terms are matched to category/terminology in the knowledge base). The query terms are then expanded through use of the knowledge base as shown in block 530 and as described above in conjunction with FIG. 6. As shown in block 540, theme sets associated with the category/terminology for the expanded query terms are selected. Through use of the knowledge base, the selected themes are expanded through a technique similar to the one used to expand the query terms as shown in block 550. As shown in block 560, sets of common denominators of expanded themes are identified for the expanded query terms. For example, if a query includes three terms, then common denominator themes that satisfy all three query terms or their expanded set, are identified. The groups of query terms, groups of expanded query terms, and the corresponding themes are relevance ranked based upon a predetermined criteria as shown in block 570. As shown in block 580, the response to the query is displayed to show: the query terms entered by the user; the groups of query terms selected from the expanded query term set; and the themes organized under the groups of expanded query terms selected.

The following example illustrates a concept knowledge base search in accordance with the embodiment shown in the flow diagram of FIG. 7. The example input query is:

Foods in Festivals of Western Europe.

With this query, a user seeks to find information about foods eaten in festivals that occur in Western Europe. There are three distinct parts for this example input query: foods, festivals, and Western Europe. The query processing analyzes the input query "food and festivals of Western Europe", and extracts the content carrying words from the input query phase. For this example, the query term processing 205 eliminates the words "in" and "of." All applicable senses and forms are generated for the terms "foods", "festivals", and "Western Europe." For example, the term "festival" is generated for the input query term "festivals", and the term "Western European" is generated for the term "Western Europe." For purposes of simplicity, this example concept knowledge base query is illustrated by analyzing the terms "festivals", "foods", and "Western Europe."

The search and retrieval system generates strengths for the query terms. (FIG. 7, block 510). In one embodiment, the search and retrieval system utilizes a lexicon that assigns quantitative values based on the content carrying strength or value of a corresponding word. Table 6 lists query term strengths for the corresponding query terms "festivals", "foods", and "Western Europe."

TABLE 6

| Query Term | Query Term Strength |
|---|---|
| Festivals | 60 |
| Foods | 100 |
| Western Europe | 50 |

Specifically, the query term "festivals" has a query term strength of 60, "foods" has a query strength of 100, and Western Europe has a query strength of "50."

Figure 8A:
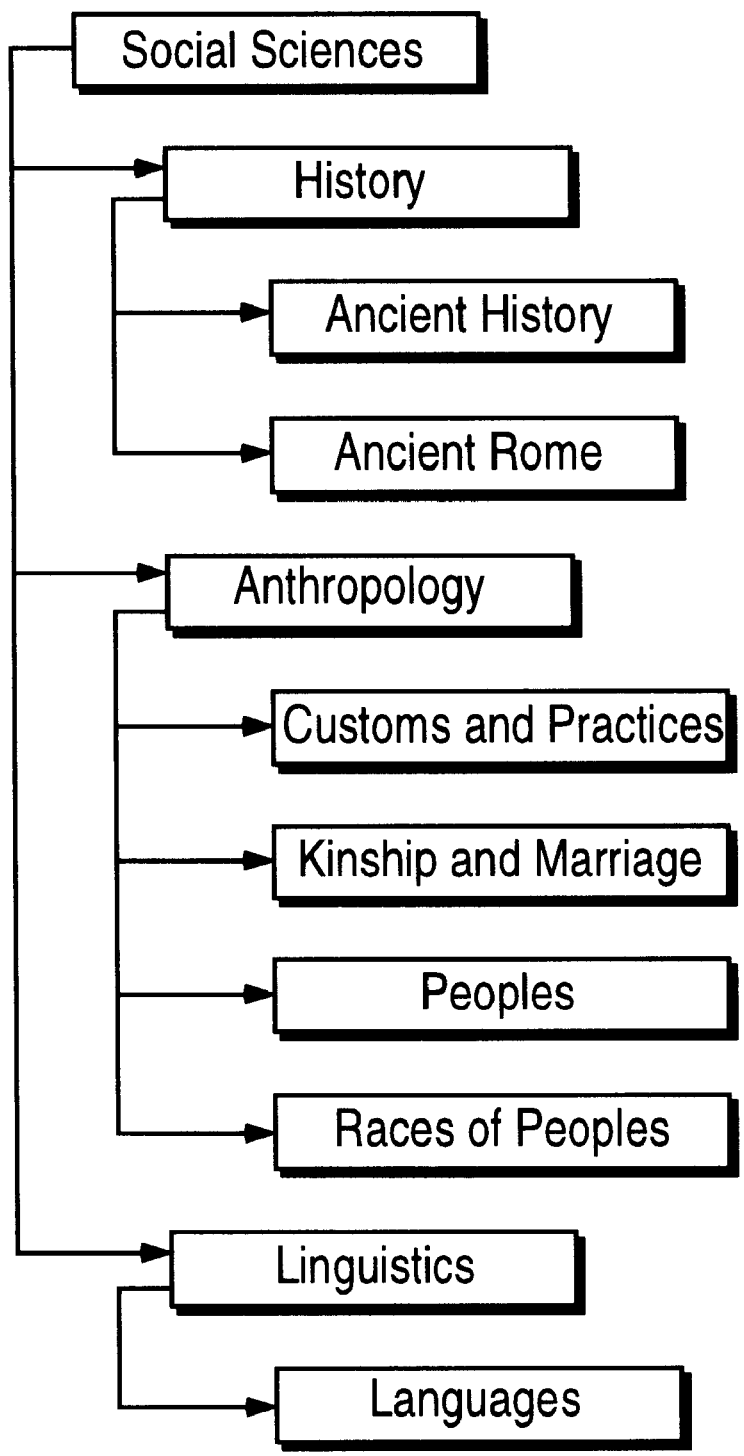
FIG. 8a illustrates one embodiment of categories, arranged hierarchically, for the "social sciences" topic.
Figure 8B:
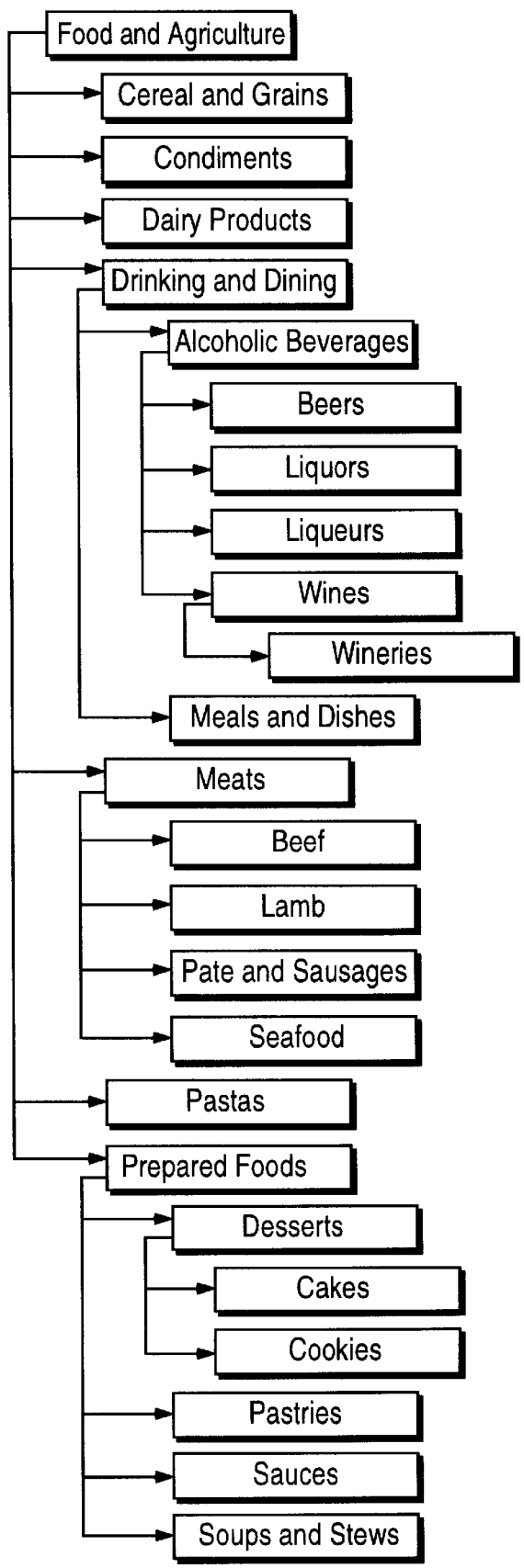
FIG. 8b illustrates one embodiment of categories, arranged hierarchically, for the "food and agriculture" topic.
Figure 8C:
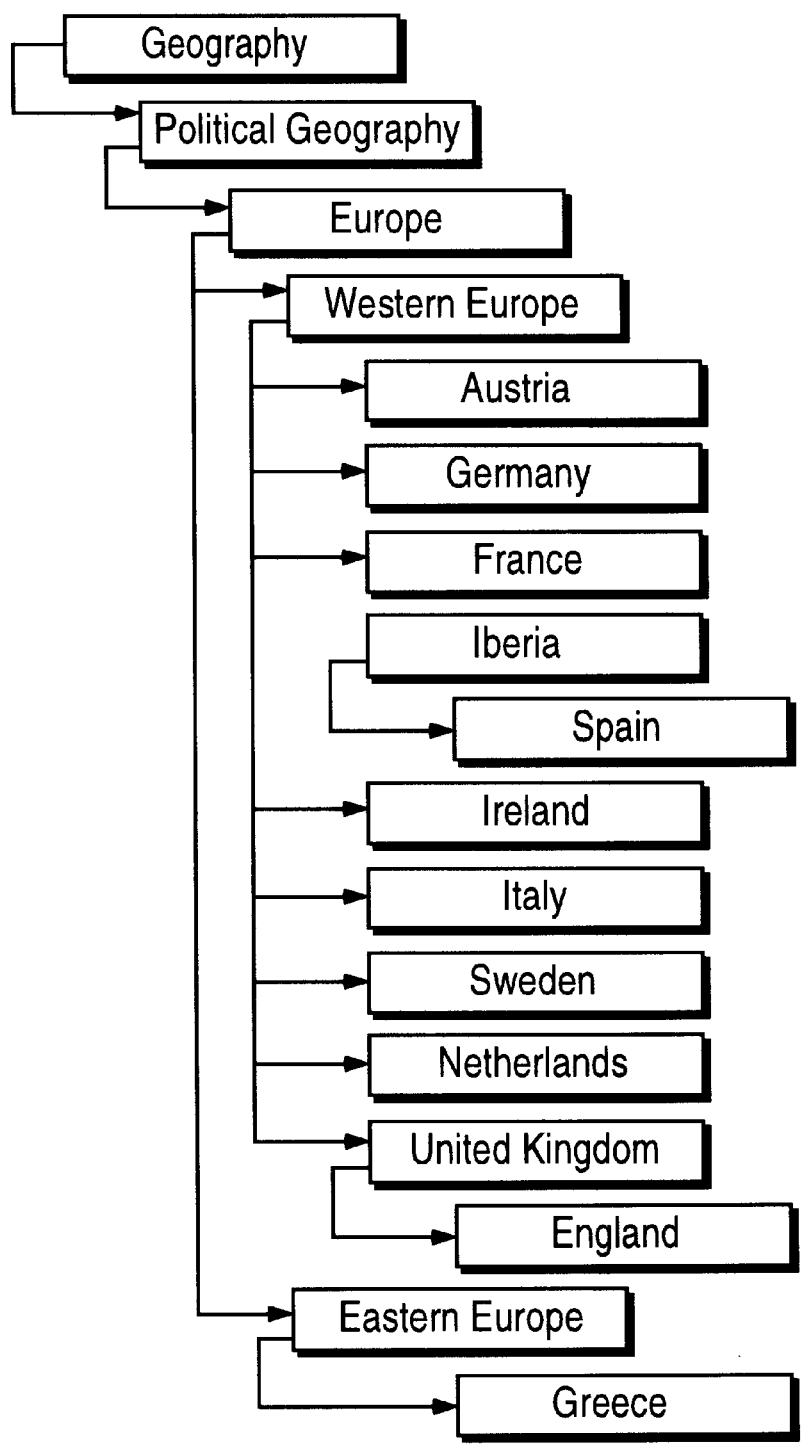
FIG. 8c illustrates one embodiment of categories, arranged hierarchically, for the "geography" topic.

Each distinct query term is mapped to a category in the knowledge base 155. (FIG. 7, block 520). FIGS. 8a–8c illustrate categories, arranged hierarchically, for three separate subjects or topics. Specifically, FIG. 8a illustrates a partial ontology for "social sciences"; FIG. 8b illustrates a partial ontology for "food and agriculture"; and FIG. 8c illustrates a partial ontology for "geography." For this query example, the query term "festivals" maps into the category "customs and practices" in the "social sciences" ontology shown in FIG. 8a. The query term "foods" maps into the high level category "food and agriculture" in the "food and agriculture" ontology shown in FIG. 8b. For the query term "Western Europe", the category "Western Europe", organized in the "geography" ontology, is selected.

Figure 9A:
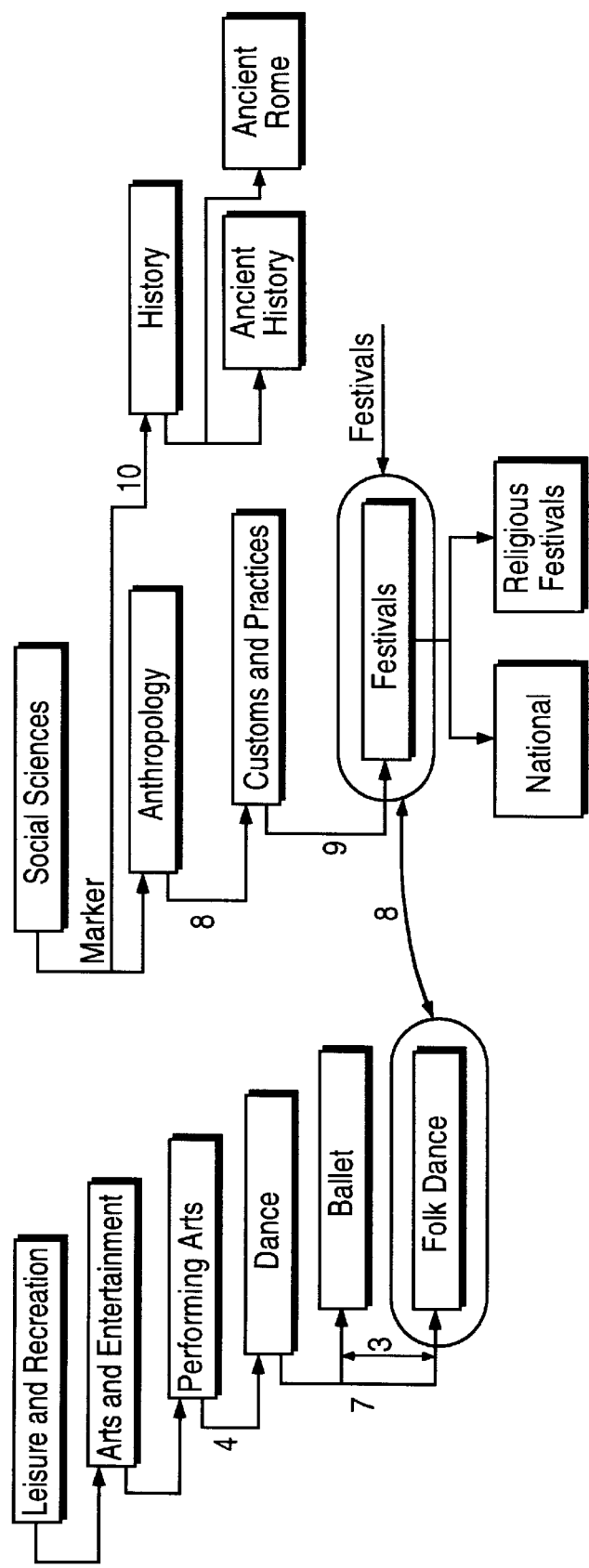
FIG. 9a illustrates an example portion of a knowledge base used to expand the query term "festivals."

The query terms are expanded, through use of the knowledge base, to generate an expanded query term set. (FIG. 7, block 530). For this query example, related categories and terminology in the knowledge base are analyzed to expand the query terms "festivals", "foods", and "Western Europe." FIG. 9a illustrates an example portion of a knowledge base used to expand the query term "festivals." The query terms are expanded through both the hierarchy for which the query term is mapped as well as other associations. FIG. 9a shows a portion of the "social sciences" hierarchy for which the "festivals" query term is mapped. Also, there is an association between the "festivals" category and the "folk dance" category. To expand the "festivals" category up the "social sciences" hierarchy, the query term strength for festivals, 60, is reduced by 50% for each point in the association weight under 10. Thus, the category "customs and practices" is selected because the query term strength for "festivals" is reduced to 30. The categories "anthropology" and "history" are also selected because the "festivals" query term strength is reduced to 7.5 at both the "anthropology" and "history" levels of the hierarchy. The expansion of the "festivals" query term also includes selecting the categories "ancient history" and "ancient Rome", which are more specific than the parent category "history." A marker above the "anthropology" level indicates that the query term cannot be expanded to a higher level.

As shown in FIG. 9a, the association between the "festivals" category and the "folk dance" category has an association weight of 8. The "festivals" query term strength of 60 is reduced to 15 at the "folk dance" category. If the association is a cross reference association (e.g., association made by a linguist), then only this single association is required to select the "festivals" category for the expanded query term set. Alternatively, if the association is a link association (e.g., generated through document processing), then an additional reference is required. The association strength of 3 between the "folk dance" and "ballet" categories renders the query term strength less than 1, and therefore the "ballet" category is not selected in the expanded query term set. The "dance" category, which has an association strength of 7 with the "folk dance" category, is included because the resultant query term strength is greater than 1. Further abstraction up levels of the "leisure and recreation" hierarchy is not performed due to the association strength between the "dance" level and the "performing arts" level.

Table 7 lists example categories/terms selected for the expanded query term set.

TABLE 7

Festivals

Customs & Practices
History
Ancient History
Ancient Rome
Folk Dance
Dance

Through the same procedure, expanded query term sets are generated for the query term "foods." However, the term "Western Europe" is a geographic term, and, in one embodiment, is handled differently. When expanding geographic terms, only those child terms/categories in the ontology are selected (e.g., parent categories higher in the hierarchy are not selected). Also, terms identified through associations in the knowledge base 155 are not selected. Tables 8 and 9 include lists of category/terms after expansion of the "foods" and "Western Europe" query terms, respectively.

TABLE 8

Foods

Cereals and Grains
Condiments
Dairy Products
Drinking & Dining
Alcoholic Beverages
Beers
Liquors
Liqueurs
Wines
Meals & Dishes
Meats
Pastas
Prepared Foods

TABLE 9

Western Europe

Austria
Germany
France
Iberia
Ireland
Italy
Sweden
Netherlands
United Kingdom

Themes or terminology are selected for the expanded query term set. (FIG. 7, block 540). In one embodiment, the search and retrieval system selects all documents classified in categories of the expanded query term set. Generally, the knowledge base includes information that topics or themes are associated with categories. For example, a document processed by the content processing system 110 may include a plurality of themes, and the content processing system 110 classifies the document in a category that reflects what the document is primarily about. The themes for that document are themes that have a context for the category for which the document was classified. Although the present invention is described in conjunction with a knowledge base that learns associations between themes/topics and categories through document classification, any system that provides context information between topics/themes and categories may be used without deviating from the spirit and scope of the invention.

In one embodiment, the search and retrieval system 100 selects all themes/topics from each category in the expanded query term set, as well as their child categories. Table 10 lists themes for the expanded query term "France" (e.g., the category "France" was selected as an expanded query term from the query term "Western Europe").

TABLE 10

France

Paris
Wine
French Cheeses
Chateau
Burgundy
Bordeaux
Impressionism
French Chefs
Mardi Gras As shown in the example list of themes in Table 10, the themes connote subject matter generally associated with the country of France, such as "impressionism art" and "chefs." Although the example list of themes in Table 10 generally connotes subject matter associated with the country of France, in one embodiment, the search and retrieval system handles geographic terms different from other terms. For this embodiment, themes associated with a geographic category typically only include geographically related themes, such as the theme "Paris", or themes with a very strong geographic association, such as a theme for "Eiffel Tower." However, for purposes of this example, the list of themes in Table 10 are used as the themes for the expanded query term "France."

Figure 9B:
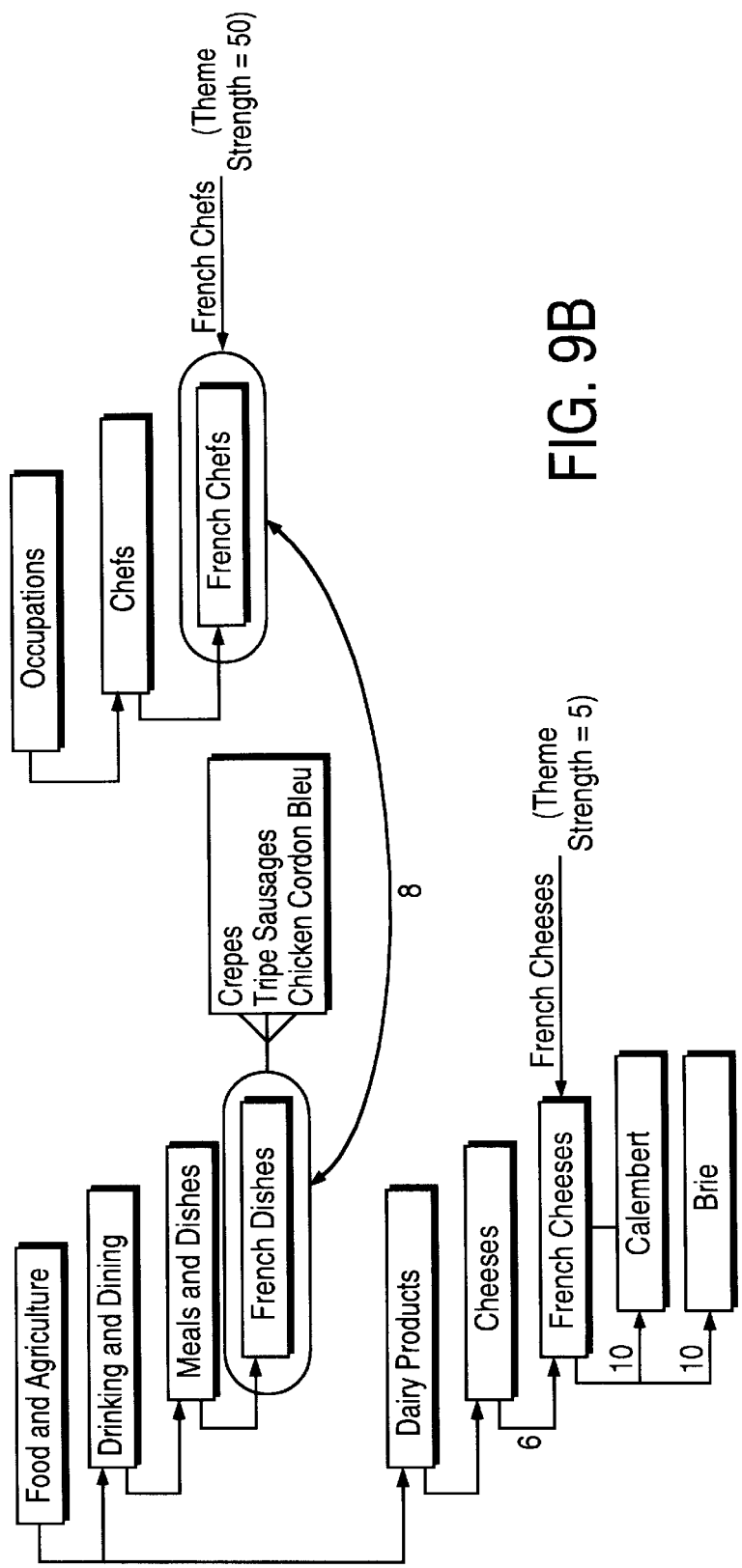
FIG. 9b is a block diagram illustrating a portion of an example knowledge base used to expand themes.

The search and retrieval system 100 expands the theme set through use of the knowledge base. (FIG. 7, block 550). The operation for expanding themes is similar to the operation of expanding query terms discussed above. FIG. 9b is a block diagram illustrating a portion of an example knowledge base used to expand themes. The category "chefs", identified from the chef theme in the "France" category, has an association with "French dishes." The theme "French chefs" maps to the "French chefs" category, a child category of "chefs." The French chefs theme has a theme strength of 50 as indicated in FIG. 9b. The association between the category "French dishes" and the category "French chefs" is strong (e.g., association strength of 8), and therefore themes classified under the category "French dishes" are selected. For this example, the themes include: crepes, tripe sausage, and chicken cordon bleu. By further way of example, the theme "French cheeses" is mapped to the "French cheeses" category in the "food and agriculture" ontology. The theme strength for French cheeses is relatively weak, at 5, and therefore the category "cheeses" is not included for the expanded theme set. Themes classified under the category "French cheeses" are selected, such as Camembert and Brie as shown in FIG. 9b.

Tables 11, 12, and 13 include a list of expanded themes for example query terms in the expanded query term set. Specifically, Table 11, for the query term "festivals", includes an extended list of themes for the expanded query terms "festivals" and "ancient Rome."

TABLE 11

| Festivals | |
|---|---|
| Festivals | Ancient Rome |
| Mardi Gras | Coliseum |
| Cinco De Mayo | Architecture |
| Carnival | Republic |
| Oktoberfest | Roadways |
| . | Law |
| . | Wine |
| . | . |
| Knockwurst | . |
| Stein | . |
| Sauerkraut | Grapes |
| Beer | Fermentation |
| Crepes | Barrels |
| Camembert | Vineyards |
| Brie | |
| Tripe Sausage | |

As shown in the example theme list, the themes generally have a linguistic, semantic, or sense association to the expanded query term. For example, the "festivals" query term includes the theme "stein", indicating the use of steins at festivals, such as Oktoberfest. Similarly, for the expanded query term "ancient Rome", themes have a semantic, linguistic or use association. For example, the themes "grapes", "fermentation", "barrels", and "vineyards", terms all associated with wine production, are introduced because the knowledge base associates wine making with ancient Rome. When expanding the themes through associations other than directly through an ontology hierarchy, the concept query processing 200 distinguishes between cross reference associations and link associations. For cross reference associations (e.g., associations generated manually by a linguist), only one association is required to select a theme. However, for link associations (e.g., associations generated through document processing), two associations are required to select a theme.

Table 12 lists example themes for the expanded query term categories "dairy products", "beers", "wines", and "meals and dishes."

TABLE 12

| Food | | | |
|---|---|---|---|
| Dairy Products | Drinking & Dining | | |
| Cheese | | | Meals & |
| Milk | Alcoholic Beverages | | Dishes |
| Butter | Beers | Wines | Knockwurst |
| . | Lager | Grapes | Sauerkraut |
| . | Wheat | Pinot Noir | Camembert |
| . | Stout | Cabernet | Crepes |
| | Draught | Sparkling | Tripe |
| | . | Fermentation | Sausage |
| | . | Barrel | Onion Soup |
| | . | Vineyard | Fish & |
| | | . | Chips |
| | | . | Chicken |
| | | . | Cordon Bleu |
| | | Mardi Gras | |
| | | Carnival | Chips & |
| | | . | Salsa |
| | | . | Burritos |
| | | . | Cheese |
| | | | Burger & |
| | | | Fries |
| | | | . |
| | | | . |
| | | | . |

The categories "alcoholic beverages" and "drinking and dining" are shown to reflect the hierarchical arrangement in the "food and agriculture" ontology. Again, the list of themes reflect topics or subject matter that has a linguistic, semantic, or use association to that category. Table 13 lists a plurality of example themes for the expanded query terms "France" and "Germany."

TABLE 13

| Western Europe | |
|---|---|
| France | Germany |
| Paris | Castles |
| Wine | Berlin Wall |
| Cheeses | Bavaria |
| Chateaux | Alps |
| Burgundy | . |
| Bordeaux | . |
| Impressionism | . |
| Chefs | |
| Mardi Gras | Beer |
| Crepes | Knockwurst |
| Tripe Sausage | Oktoberfest |
| Croissant | Stein |

TABLE 13-continued

Western Europe

| France | Germany |
|---|---|
| Chicken Cordon Bleu | Sauerkraut |
| . | |
| . | |
| . | |

As discussed above, in one embodiment, the search and retrieval system handles geographic terms different from other terms. However, for purposes of this example, the example themes listed in Table 13 include themes beyond geographically related terms.

The search and retrieval system selects common denominators of expanded themes among the expanded query terms to satisfy as many parts of the input query as possible. (FIG. 7, block 560). The search and retrieval system compares themes among the different query terms to identify common denominators. For this example, themes identified for the query term "foods" (Table 12), themes for the query term "Western Europe" (Table 13), and themes for the query term "festivals" (Table 11) are compared. From this comparison, theme groups are extracted.

Figure 9C:
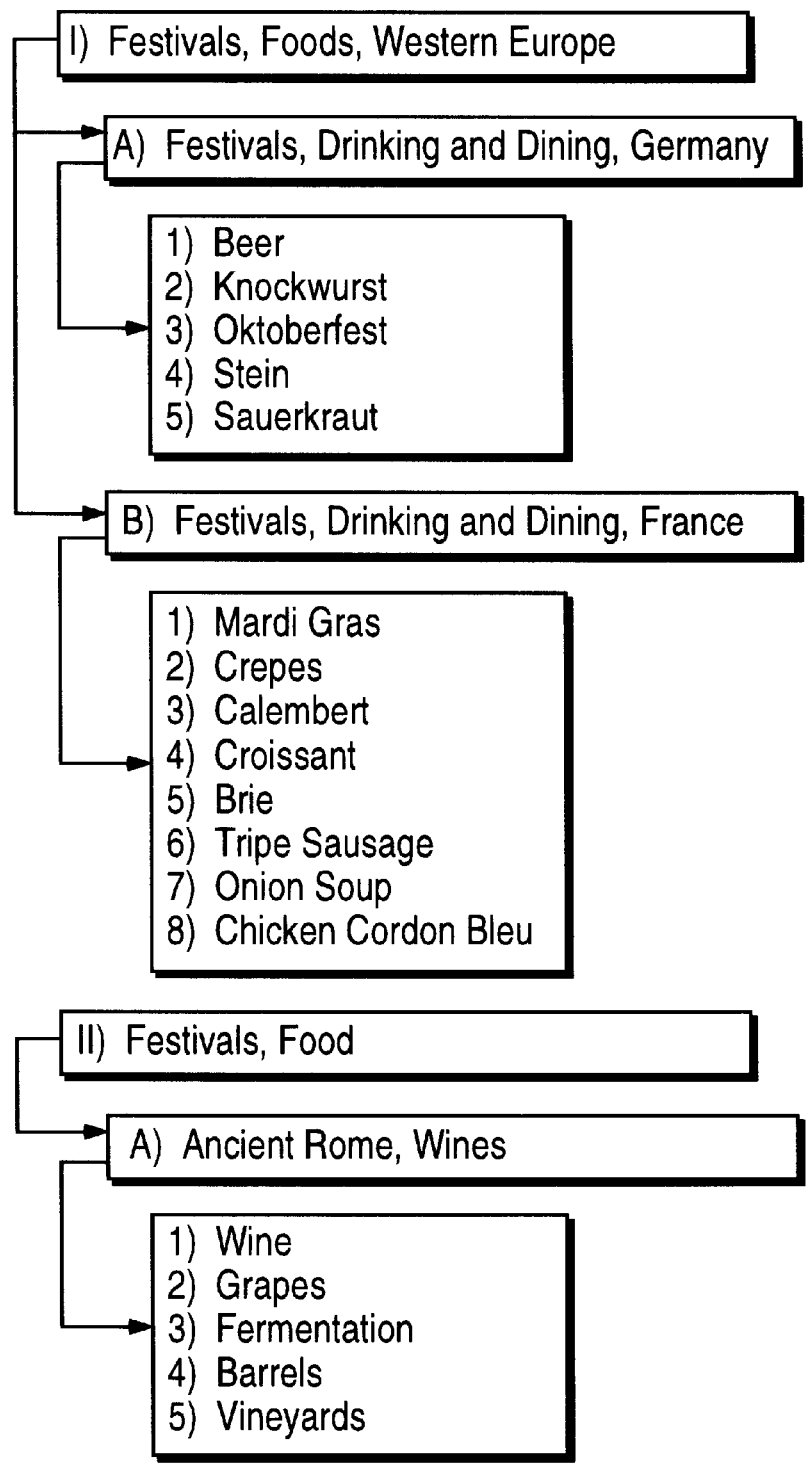
FIG. 9c illustrates one embodiment for a search and retrieval response in accordance with the example query input.

FIG. 9c illustrates one embodiment for a search and retrieval response in accordance with the example query input. As shown in FIG. 9c, three groups, which satisfy at least a portion of the input query, were identified. Group IA and IB all included themes found in expanded terms for the "festivals", "food", and "Western Europe" input query terms. Specifically, for group IA, the themes: beer, knockwurst, Oktoberfest, stein and sauerkraut, all appear under the categories "customs and practices", "drinking and dining", and "Germany." The expanded query term "customs and practices" maps to "festivals", the "drinking and dining" expanded query term maps to the "foods" category, and the extended query term category "Germany" maps to the query term "Western Europe." For group IB, the extended query terms "festivals", "drinking and dining", and "France" include the themes Mardi Gras, crepes, Camembert, croissant, brie, tripe sausage, onion soup and chicken cordon bleu. Thus, similar to group IA, all distinct parts of the query were satisfied with the corresponding list of themes. For group IIA, two query terms were satisfied (e.g., festivals and foods). The extended query categories "ancient Rome" and "wines" both contain themes for wine, grapes, fermentation, barrels and vineyards.

In one embodiment, the groups are relevance ranked based on a predetermined criteria. For this embodiment, the order in which groups appear on the output display is based on: 1) the number of query terms the group satisfies; 2) the total weight for the query terms satisfied; and 3) the total weight of the themes. Table 14 illustrates the relevance ranking calculation for the example input query.

TABLE 14

| Group | # of Query Terms (x factor) | Total Query Weights (x factor) | Total Theme Weights | Total |
|---|---|---|---|---|
| IA | $3 \times 10^6$ | 210,000 | 290 | 3,210,290 |
| IB | $3 \times 10^6$ | 210,000 | 196 | 3,210,196 |
| IIA | $2 \times 10^6$ | 160,000 | 290 | 2,160,442 |

Groups IA and IB, which both satisfied each query term, receive a score of three million for the number of query terms criteria. For the number of query terms criteria, a number is calculated based on the actual number of query terms satisfied multiplied by a factor (e.g., one million). The total query term weight is summed for all the query terms satisfied, and the sum is multiplied by a factor of 1,000. The total theme weights are not multiplied by a factor. As shown in Table 14, the total score received is a sum of the previous three columns.

For the output format shown in FIG. 9c, the groups IA, IB, and IIA are relevance ranked based on the total score (i.e., the total shown in Table 14). The ordering of the original query terms is based on the query term strength (see Table 6). The ordering of groups is based on the total score a group receives. Thus, group IA appears before group IB.

The listing of themes is based on the theme weight of the individual themes. For the embodiment shown in FIG. 9c, the themes are ordered from the greatest theme weight to the lowest theme weight. Tables 15, 16 and 17 include themes, and their corresponding theme weight, for groups IA, IB, and IIA, respectively.

TABLE 15

| Theme | Theme Weight |
|---|---|
| Knockwurst | 90 |
| Oktoberfest | 66 |
| Stein | 27 |
| Sauerkraut | 7 |
| Beer | 100 |

TABLE 16

| Theme | Theme Weight |
|---|---|
| Fermentation | 41 |
| Barrels | 16 |
| Vineyard | 4 |
| Wine | 80 |
| Grapes | 55 |

TABLE 17

| Theme | Theme Weight |
|---|---|
| Crepes | 60 |
| Croissant | 50 |
| Camembert | 54 |
| Mardi Gras | 110 |
| Tripe Sausage | 47 |
| Brie | 49 |
| Onion Soup | 40 |
| Chicken Cordon Bleu | 32 |

For the embodiment shown in FIG. 9c, the response to a query includes three types of information. First, identified by the roman numeral headings, the distinct portions of the input query that were satisfied are displayed. For example, for II, the search and retrieval system displays "festivals" and "foods." The categories followed by the capital letters identify to the user the categories used to satisfy the input query. For the example group IA, although the user input the category "foods", the search and retrieval system responded using the category "drinking and dining."

As shown by the above example, the concept knowledge base query does not identify specific documents available in the search and retrieval system 100. Instead, only areas for which potential documents may be classified are identified to the user. A user may then select documents from the categories identified in response to the concept knowledge base query. If documents in the identified areas are not available, then the user may search other resources, such as the Internet, through use of the categories/topics identified in the response to the concept knowledge base query. Thus, the concept knowledge base query provides a map to the user of potential areas for which a query response may locate information relevant to the query.

Figure 10A:
FIG. 10a illustrates an example display of the search and retrieval system to the query "Internet."

Search and Retrieval System Display Embodiments:

FIGS. 10a and 10b illustrate example display responses for the search and retrieval system to the search query "Internet." In response to the Internet query, the search and retrieval system located fifteen documents classified for the category "computer networking." Also, the search and retrieval system identified the terms "Internet Credit Bureau, Incorporated", "Internet Fax Server", "Internet Productions, Incorporated", and "Internet Newbies." As discussed above, for a concept knowledge base query, the results are based on the query mapped to the knowledge base 155. Although no documents were classified under the terms "Internet Credit Bureau, Incorporated", "Internet Fax Server", "Internet Productions, Incorporated", and "Internet Newbies", the terms relate to the search query. The terms are displayed based on the relevance to the search term "Internet." For this embodiment, the relevancy system, indicated by the number of stars, indicates that the category "computer networking" is the most relevant to the query term "Internet."

FIG. 10b illustrates an example response when a user selects the category "computer networking." In response to this selection, the search and retrieval system displays a plurality of subcategories for which documents have been classified. Specifically, the search and retrieval system displayed the subcategories "Electronic Mail", "GE Networks", "Internet Technology", "Messaging", "NBC Networks", and "Networks." Thus, users are provided with more specific categories, relating to computer networking, to locate information about the general query term "Internet." The search and retrieval system also displays documents that contain information about computer networking, but are classified under different categories (e.g., Colorado, Mexican, NBC Officials, State Agencies, and Television and Radio). Furthermore, the search and retrieval system displays categories related to the computer networking category (e.g., see also Computer Hardware Industry, Computer Industry, Computer Standards, Information Technology, and Mathematics).

FIG. 11a illustrates an example display of the search and retrieval system to the factual query "stocks." In response to the query "stocks", the search and retrieval system maps the query into the knowledge base 155 to obtain all senses of related categories and terminology. For this example, sixty three categories were identified. The categories are relevance ranked, and the category "commerce and trade" is the most relevant.

FIG. 11b illustrates an example display in response to the selection to the category "portfolios." For this embodiment, the display indicates that four documents are classified in the category "portfolios." The search and retrieval system displays the name of the four documents, as well as the categories for which these documents have been classified.

Subject Profile Queries:

The search and retrieval system of the present invention generates "profiles" of subjects. In general, the profiles provide context to a user regarding availability of information for a particular subject. For purposes of nomenclature, the information is available through a "repository of information." In one embodiment, the repository of information is a set of documents (e.g., books, periodicals, newspapers, etc.) accessible to the search and retrieval system, such as a repository of documents accessible through an on-line service. For the profile query function, the user of the search and retrieval system enters a subject to ascertain a profile of that subject. In response to the profile query, the search and retrieval system displays one or more topics. Each topic or category provides a context for which the subject appears in one or more documents in the repository of documents.

FIG. 12 illustrates an example display for a profile query in accordance with one embodiment of the present invention. For the profile query function, the user of the search and retrieval system 100 enters a subject to ascertain a profile, with regard to the available information, for the subject. For the example shown in FIG. 12, the user enters the subject "President George Herbert Walker Bush." In response, the search and retrieval system displays 17 topics or categories. In addition, the search and retrieval system notes that 28 documents have been identified, and that the 28 documents have been classified in the 17 categories displayed. Thus, for the example repository of information, the subject, George Herbert Walker Bush, appeared in 28 different documents, and the 28 documents were classified in 17 different topics or categories. The first topic displayed, President George Herbert Walker Bush, appeared in 7 documents that are primarily about George Bush as President of the United States. The subject, President George Herbert Walker Bush, also appeared in 6 documents primarily about the second topic displayed, "Republican Party." Similarly, as shown in the example display of FIG. 12, 15 additional categories or topics were identified for the subject "President George Herbert Walker Bush."

By viewing a response to a profile query, a user of the search and retrieval system can readily ascertain the different contexts for which the subject appears in the repository of documents. For the example display shown in FIG. 12, if the user desired information specifically about President George Bush's position or his effect on "Capital Gains Taxes", then the user is immediately steered towards the document classified or categorized for the topic "Capital Gains Taxes." By further way of example, if the user seeks information about President Bush in the context of "Campaigns", then the user is immediately guided to the document classified for the "Campaigns" topic. Accordingly, the profile inquiry of the present invention provides an overview or profile of a subject as the subject relates to a repository of information.

As shown in the embodiment of FIG. 12, the search and retrieval system displays stars, adjacent to a topic, to indicate the relevancy of that topic to the subject. For the example shown in FIG. 12, the category "President George Herbert Walker Bush", which received two stars, is the most relevant topic to the subject. A description of a relevancy criteria for use with the search and retrieval system is described above in the section "Factual Knowledge Base Queries."

The profile query functions utilize the rich thematic information available as a result of the content processing system 110. The search and retrieval system, by processing documents (e.g., information), permits a true understanding of the thematic content of the repository of information. Thus, when a user receives topics that define a profile for a subject, those topics truly reflect the thematic content of the repository of information. Accordingly, the profile query of the search and retrieval system permits a robust and comprehensive means to provide a user the profile of a subject for a repository of information processed by the content processing system.

The profile query utilizes some of the same processes used in the factual and concept knowledge base queries discussed above. In general, the profile query process involves determining documents that include information on the subject. In one embodiment, the subjects are processed by the query term processing 205. The functions performed in the query term processing 205, are described fully above. The subject, or subjects, output from the query term processing 205 are used to search all accessible documents. For each document identified, a corresponding topic or category is determined through the document theme vector 160 (Table 1). In one embodiment, the topics correspond to nodes in the knowledge base.

The identified categories/topics are then relevance ranked for display. In one embodiment, the topics are relevance ranked based on the greatest total document strength. The total document strength is calculated by summing the individual document strengths for each document identified for a category. For the example display shown in FIG. 12, the topic "President George Herbert Walker Bush" is ranked first because the total document strength, based on the 7 corresponding documents, is larger than the total document strength of the 6 documents summed for the category "Republican Party." The topics are displayed in the relevance ranked order.

The profile inquiry has application for use on the Internet. The Internet permits access to a vast amount of information; however, a user is required to sift through the information without any particular guidance as to the context for which a subject appears. With use of the profile query of the present invention, the user receives the context of information available so that the user may readily identify the most relevant information.

Figure 13:
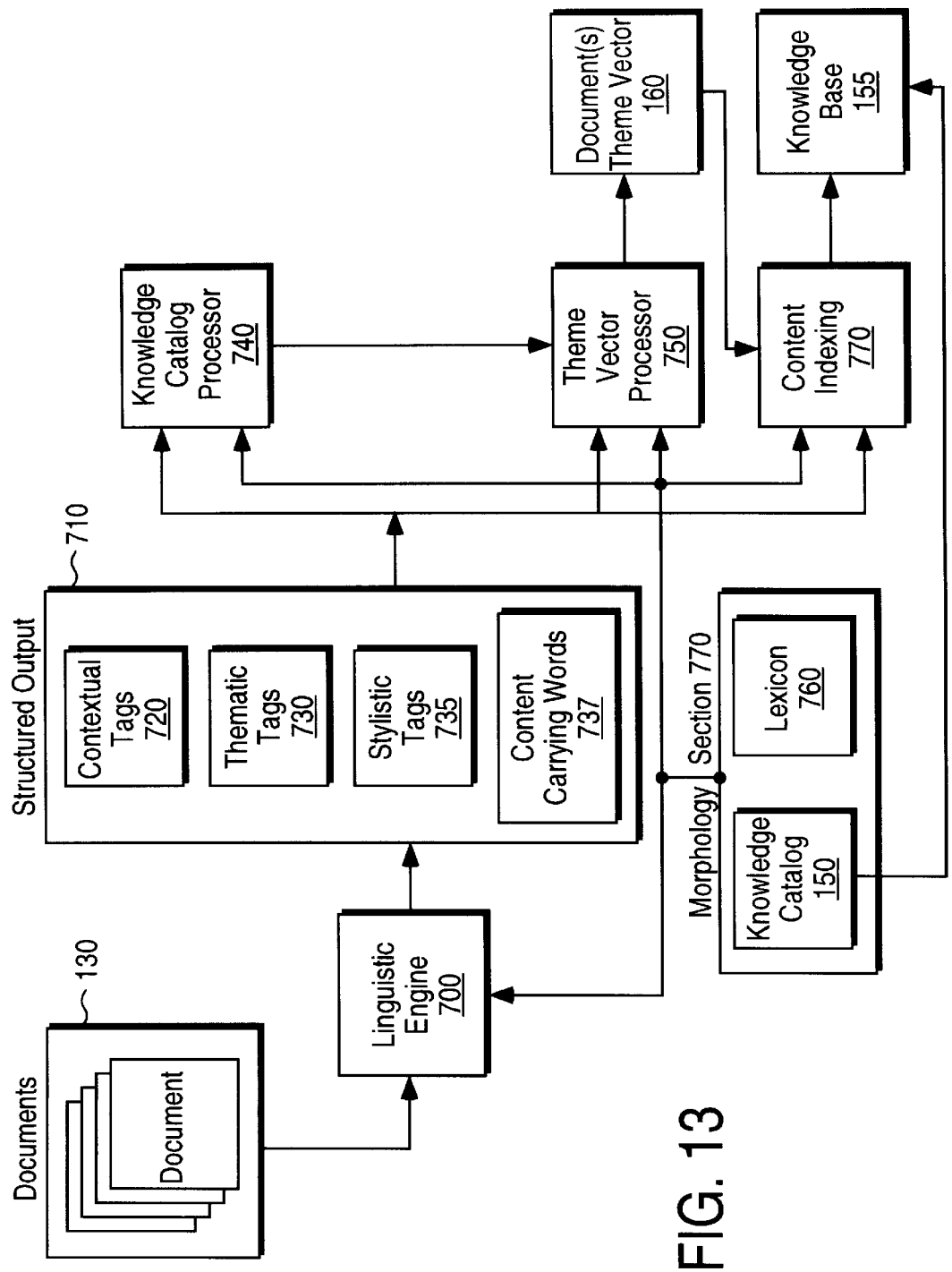
FIG. 13 is a block diagram illustrating one embodiment for a content processing system.

A Content Processing System:

FIG. 13 is a block diagram illustrating one embodiment for a content processing system. In general, the content processing system 110 analyzes the document set 130 and generates the document theme vector 160. For this embodiment, the content processing system 110 includes a linguistic engine 700, a knowledge catalog processor 740, a theme vector processor 750, and a morphology section 770. The linguistic engine 700 receives, as input, the document set 130, and generates, as output, the structured output 710. The linguistic engine 700, which includes a grammar parser and a theme parser, processes the document set 130 by analyzing the grammatical or contextual aspects of each document, as well as analyzing the stylistic and thematic attributes of each document. Specifically, the linguistic engine 700 generates, as part of the structured output 710, contextual tags 720, thematic tags 730, and stylistic tags 735 that characterize each document. Furthermore, the linguistic engine extracts topics and content carrying words 737, through use of the thematic tags 730, for each sentence in the documents. For a detailed description of the contextual and thematic tags, see U.S. patent application Ser. No. 08/454, 745, inventor Kelly Wical, entitled "Content Processing System for Discourse", filed May 31, 1995, that includes an Appendix C, entitled "Analysis Documentation."

In one embodiment, the linguistic engine 700 generates the contextual tags 720 via a chaos loop processor. All words in a text have varying degrees of importance in the text, some carrying grammatical information, and others carrying the meaning and content of the text. In general, the chaos loop processor identifies, for words and phrases in the documents, grammatical aspects of the documents including identifying the various parts of speech. In order to accomplish this, the chaos loop processor ascertains how the words, clauses and phrases in a sentence relate to each other. By identifying the various parts of speech for words, clauses, and phases for each sentence in the documents, the context of the documents is defined. The chaos loop processstores information in the form of the contextual tags 720. U.S. patent application Ser. No. 08/454,745, now U.S. Pat. No. 5,694,523, inventor Kelly Wical, entitled "Content Processing System for Discourse", filed May 31, 1995, includes an Appendix B, entitled "Chaos Processor for Text", that contains an explanation for generating contextual or grammatical tags.

A theme parser within the linguistic engine 700 generates the thematic tags 730. Each word carries thematic information that conveys the importance of the meaning and content of the documents. In general, the thematic tags 730 identify thematic content of the document set 130. Each word is discriminated in the text, identifying importance or meaning, the impact on different parts of the text, and the overall contribution to the content of the text. The thematic context of the text is determined in accordance with predetermined theme assessment criteria that is a function of the strategic importance of the discriminated words. The predetermined thematic assessment criteria defines which of the discriminated words are to be selected for each thematic analysis unit. The text is then output in a predetermined thematic format. For a further explanation of a theme parser, see Appendix E, entitled "Theme Parser for Text", of U.S. patent application Ser. No. 08/454,745, now U.S. Pat. No. 5,694, 523, inventor Kelly Wical, entitled "Content Processing System for Discourse", filed May 31, 1995.

As shown in FIG. 13, the morphology section 770 contains the knowledge catalog 150 and a lexicon 760. In general, the lexicon 760 stores definitional characteristics for a plurality of words and terms. For example, the lexicon 212 defines whether a particular word is a noun, a verb, an adjective, etc. The linguistic engine 700 uses the definitional characteristics stored in the lexicon 760 to generate the contextual tags 720, thematic tags 730, and the stylistic tags 735. An example lexicon, for use with a content processing system, is described in Appendix A, entitled "Lexicon Documentation", of U.S. patent application Ser. No. 08/454, 745, now U.S. Pat. No. 5,694,523, inventor Kelly Wical, entitled "Content Processing System for Discourse", filed May 31, 1995.

The topics and content carrying words 737 are input to the knowledge catalog processor 740. In part, the knowledge catalog processor 740 processes the content carrying words for direct use with the knowledge catalog 150 and knowledge base 155. Specifically, the knowledge catalog processor 740 generates, as appropriate, the nominal or noun form of each content carrying word, as well as the count sense and mass sense of the word. Furthermore, the knowledge catalog processor 740 determines, from the knowledge catalog 150, which content carrying words are non ambiguous.

As shown in FIG. 13, the theme vector processor 750 receives the thematic tags 730 and contextual tags 720 from the structured output 710. In addition, the non ambiguous content carrying words from the knowledge catalog processor 740 are input to the theme vector processor 750. The content carrying words may include single words or phrases. The content carrying words output from the knowledge catalog processor 240 are converted to the noun or nominal form. In general, the theme vector processor 750 presents a thematic profile of the content of each document (e.g. generates the document theme vector 160 including classifying the documents in the knowledge catalog 150. To accomplish this, the theme vector processor 750 determines the relative importance of the non ambiguous content carrying words in the document set.

In one embodiment, the theme vector processor 750 generates a list of theme terms, including words and phrases, and assigns a relative theme strength to each theme term. The theme vector processor 750, through use of the knowledge catalog 150, generates a theme concept for each theme term by mapping the theme terms to categories in the knowledge catalog 150. Thus, the theme concepts indicate a general topic or category in the knowledge catalog 150 to identify the content of each document. In addition, the theme vector processor 750 generates, for each theme term, an importance number, a theme strength, and an overall capacity weight of collective content importance.

As discussed above, each theme identified in the document theme vector 160 is assigned a normalized or relative theme strength. The normalized theme strength is calculated using the theme strengths of each theme term in the text that contributes to the particular theme. At the sentence level, the theme vector processor 750 calculates a theme strength for each content carrying word in the sentence. The theme strength of the word measures the thematic weight of the word within the context of the sentence in which it appears. Prior to processing, each content carrying word receives a default theme strength that varies depending upon the word. As the theme vector processor 750 analyzes the surrounding text in the sentence to determine the thematic role of the word, it increases or decreases the theme strength for the word. For example, a theme grading determines how each word in a sentence is functioning within the context and structure of the sentence. The theme grading assigned to a word affects the theme strength for the word.

In one embodiment, the theme vector processor 750 executes a plurality of heuristic routines to generate the theme strengths for each theme. U.S. patent application Ser. No. 08/454,745, now U.S. Pat. No. 5,694,523, inventor Kelly Wical, entitled "Content Processing System for Discourse", contains source code to generate the theme strengths in accordance with one embodiment for theme vector processing. The source code includes detailed comments to explain the operation of the code. Although the generation of the theme strengths is disclosed as computer source code, the theme strengths may be generated by any means, such as a hardware implementation, without deviating from the spirit or scope of the invention. Also, a further explanation of generating a thematic profile is contained in U.S. patent application Ser. No. 08/454,745, now U.S. Pat. No. 5,694,523, inventor Kelly Wical, entitled "Content Processing System for Discourse", filed May 31, 1995, which is herein incorporated by reference.

Dynamic Classification of Terminology:

The content indexing processor 770 shown in FIG. 13 identifies index phrases including index heads and index context entries that relate to the index heads. The index heads are content carrying words from the documents but the words are not pre-defined categories in the classification system. For example, the term "OS/2", which defines a specific operating system, is a content carrying noun. However, in one embodiment of a classification system, "OS/2" is not a specific category. If the documents 130 include material on "OS/2", then "OS/2" is stored as an index head. The index context entries are index phrases that are used within the context of an index head. For the OS/2 example above, if a document contained information on the marketing of the OS/2 operating system, then "marketing" is stored as an index context entry for the index head "OS/2." Note that marketing may also be stored as an index head. Index heads are dynamically classified in the classification hierarchy, and that classification is stored with the index head.

The knowledge base 155, which includes categories classified for the documents 130, identifies relationships among index heads, index context entries, and themes. To identify these relationships, the knowledge base 155 includes an index table and an index/topic table. The index table contains index information from the documents 130, including the text and location of the index phrases. If the index context entry is not an index head, then the index table contains the parent or index head for the index context entry. The index/topic table contains cross references between indexes, stored in the index table, and categories classified in document theme vector 116. For example, in one document, the index head "OS/2" may be mapped to the category "operating systems." For this example, the index/topic table reflects, for that document, the use of the term "OS/2" to connote an operating system. Therefore, the index/topic table provides a link between the index phrases and the categories in the classification hierarchy. A further explanation of generating a thematic profile is contained in U.S. patent application Ser. No. 08/455,484, inventor Kelly Wical, entitled "Method and Apparatus for Determining Theme for Discourse", filed May 31, 1995, which is herein incorporated by reference.

As discussed above, themes, which do not have a corresponding category in the classification hierarchy, are dynamically classified such that categories are generated to reflect terminology specific to a document. Once the new categories are generated, these categories are mapped into the pre-defined categories of the classification hierarchy.

In operation, the content indexing processor 770 receives themes from the document theme vector 116. In the preferred embodiment, categories in the classification hierarchy are based on noun concepts. Based on the contextual tags 720 and thematic tags 730, the content carrying words from the documents 130 are identified. The head words represent all content carrying words in the documents 130. Generally, all nouns contained in the documents 130 are candidates for head words. The content indexing processor 770 utilizes contextual tags 720 and thematic tags 730 to determine nouns that contain little or no content value. For example, the noun "copies", without any additional support, carries little content alone. Therefore, if a noun is characterized as "weak" from the contextual tags 720 or thematic tags 730, then the noun is not utilized as a head word.

At this point, the content indexing processor 770 generates a plurality of head words, wherein each head word carries content. For each head word, at least one contextual relationship is noted. In one embodiment, the context for each head word is listed hierarchically such that a second contextual relationship to the head word is a more detailed relationship than the first contextual relationship for that head word. From these contextual relationships, the content indexing processor 770 develops categories not included in the classification hierarchy. Specifically, the new categories, arranged in a hierarchical structure, are dynamically generated based on head words and contextual relationships to the head words. After dynamically developing the new hierarchies, the content indexing processor 770 maps the dynamic hierarchies into pre-existing categories of the classification hierarchy. Thus, the content indexing processor 770 classifies terms of the documents 130 in the knowledge base 155 to extend the pre-existing categories of the classification hierarchy. For a further explanation of content indexing processing, see U.S. patent application, entitled "A Content Processing System for Discourse" Ser. No. 08/454,745, filed May 31, 1995, issued as U.S. Pat. No. 5,694,523, on Dec. 2, 1997 inventor Kelly Wical, and is herein expressly incorporated by reference. U.S. patent application, entitled "A Content Processing System for Discourse" Ser. No. 08/454,745, issued as U.S. Pat. No. 5,694,523, includes Appendix I, entitled "Content Indexing Code", that contains a source code listing for implementing content indexing processing in accordance with one embodiment of the present invention.

Learning Processing:

In one embodiment for the search and retrieval system, the learning processing 165 learns words and phrases (e.g. terminology) in the context of a set of documents. During an accumulation phase, the learning system accumulates contextual data from the set of documents for the term. In general, the contextual data specifies lexical classifications of documents in which the term appears based on the uses of other terms in the document set. In a subsequent computational phase, the learning system analyzes the contextual classification data to select, if the term is unambiguous, a single general classification for the term. The learning system, through accumulating contextual data from the set of documents prior to analyzing, uses a wholeness approach to learning.

In one embodiment, the learning processing 165 is used in conjunction with a classification system, such as the knowledge catalog 150. As discussed above, the categories in the knowledge catalog 150 reflect lexical relationships among parent and child categories. For this embodiment, the learning system, to accumulate contextual data, classifies the term in the categories, wherein the classifications are based on uses of the terms in the set of documents. The learning processing 165 analyzes the contextual data, and selects a single category, or multiple if ambiguous, in the classification system to classify the term. Thus, the learning processing 165 generates lexical associations to learn terminology.

The learning processing 165, during the accumulation phase, generates a lexical categorization schema based on the knowledge catalog 150. The categorization schema includes nodes of the knowledge catalog. The nodes correspond to the categories of the classification hierarchy that were classified for the terms in the accumulation phase. The contextual data specifies the number of documents that were classified to each node and a classification strength indicating the strength of the corresponding classification. The learning processing 165 analyzes the categorization schema to select the best node for the term. The learning processing 165, in an attempt to specifically define the term, selects a node in the lowest level of the classification hierarchy supported by the contextual data.

Figure 14:
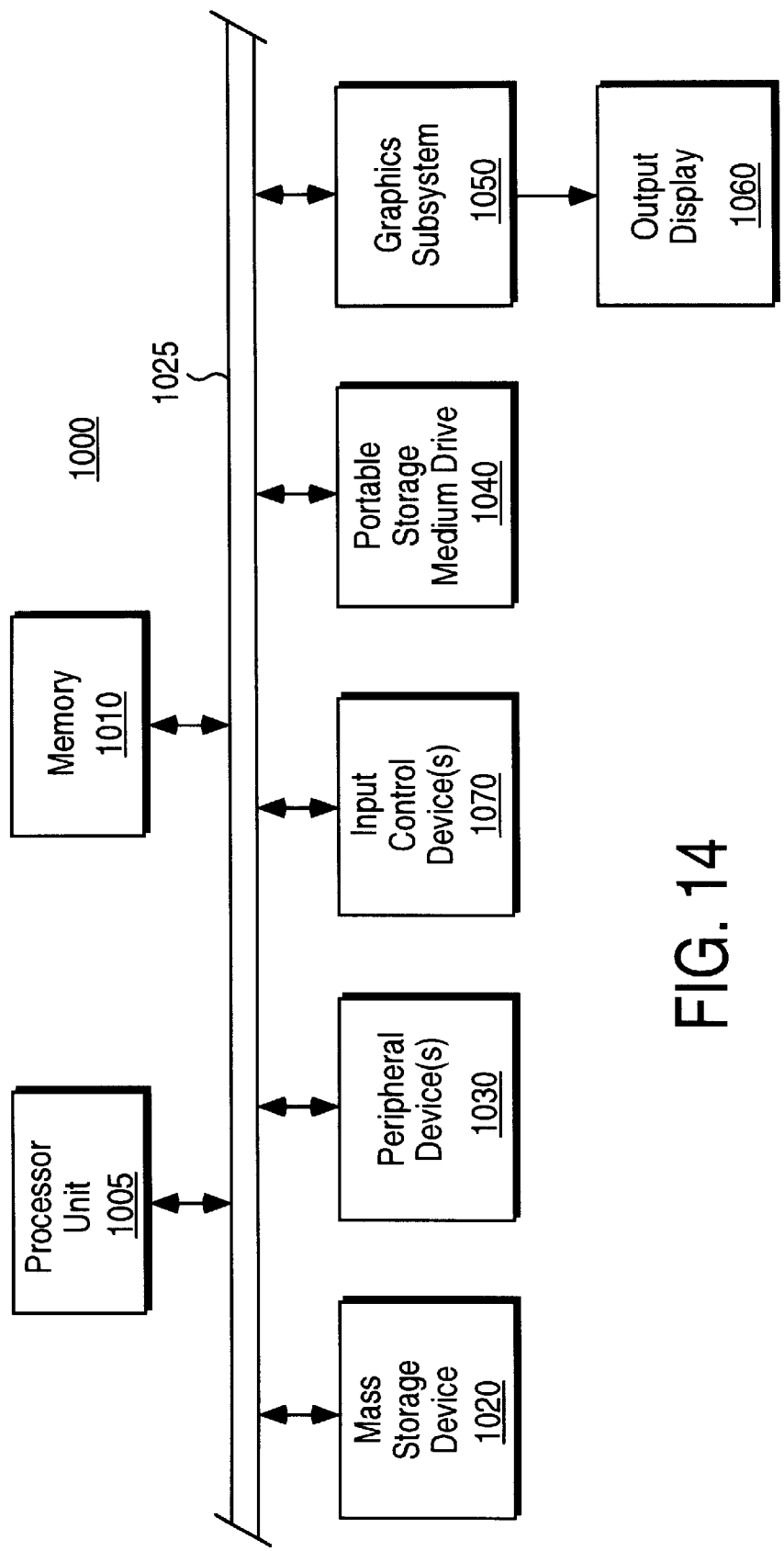
FIG. 14 illustrates a high level block diagram of a general purpose computer system in which the search and retrieval system of the present invention may be implemented.

Computer system:

FIG. 14 illustrates a high level block diagram of a general purpose computer system in which the search and retrieval system of the present invention may be implemented. A computer system 1000 contains a processor unit 1005, main memory 1010, and an interconnect bus 1025. The processor unit 1005 may contain a single microprocessor, or may contain a plurality of microprocessors for configuring the computer system 1000 as a multi-processor system. The main memory 1010 stores, in part, instructions and data for execution by the processor unit 1005. If the search and retrieval system of the present invention is wholly or partially implemented in software, the main memory 1010 stores the executable code when in operation. The main memory 1010 may include banks of dynamic random access memory (DRAM) as well as high speed cache memory.

The computer system 1000 further includes a mass storage device 1020, peripheral device(s) 1030, portable storage medium drive(s) 1040, input controldevice(s) 1070, a graphics subsystem 1050, and an output display 1060. or purposes of simplicity, all components in the computer system 1000 are shown in FIG. 14 as bing connected via the bus 1025. However, the computer system 1000 may be connected through one or more data transport means. For example, the processor unit 1005 and the main memory 1010 may be connected via a local microprocessor bus, and the mass storage device 1020, peripheral device(s) 1030, portable storage medium drive(s) 1040, graphics subsystem 1050 may be connected via one or more input/output (I/O) busses. The mass storage device 1020, which may be implemented with a magnetic disk drive or an optical disk drive, is a non-volatile storage device for storing data and instructions for use by the processor unit 1005. In the software embodiment, the mass storage device 1020 stores the search and retrieval system software for loading to the main memory 1010.

The portable storage medium drive 1040 operates in conjunction with a portable non-volatile storage medium, such as a floppy disk or a compact disc read only memory (CD-ROM), to input and output data and code to and from the computer system 1000. In one embodiment, the search and retrieval system software is stored on such a portable medium, and is input to the computer system 1000 via the portable storage medium drive 1040. The peripheral device (s) 1030 may include any type of computer support device, such as an input/output (I/O) interface, to add additional functionality to the computer system 1000. For example, the peripheral device(s) 1030 may include a network interface card for interfacing the computer system 1000 to a network. For the software implementation, the documents may be input to the computer system 1000 via a portable storage medium or a network for processing by the search and retrieval system.

The input control device(s) 1070 provide a portion of the user interface for a user of the computer system 1000. The input control device(s) 1070 may include an alphanumeric keypad for inputting alphanumeric and other key information, a cursor control device, such as a mouse, a trackball, stylus, or cursor direction keys. In order to display textual and graphical information, the computer system 1000 contains the graphics subsystem 1050 and the output display 1060. The output display 1060 may include a cathode ray tube (CRT) display or liquid crystal display (LCD). The graphics subsystem 1050 receives textual and graphical information, and processes the information for output to the output display 1060. The components contained in the computer system 1000 are those typically found in general purpose computer systems, and in fact, these components are intended to represent a broad category of such computer components that are well known in the art.

The search and retrieval system may be implemented in either hardware or software. For the software implementation, the search and retrieval system is software that includes a plurality of computer executable instructions for implementation on a general purpose computer system. Prior to loading into a general purpose computer system, the search and retrieval system software may reside as encoded information on a computer readable medium, such as a magnetic floppy disk, magnetic tape, and compact disc read only memory (CD-ROM). In one hardware implementation, the search and retrieval system may comprise a dedicated processor including processor instructions for performing the functions described herein. Circuits may also be developed to perform the functions described herein. The knowledge catalog 150 and knowledge database 155 may be implemented as a database stored in memory for use by the search and retrieval system.

Although the present invention has been described in terms of specific exemplary embodiments, it will be appreciated that various modifications and alterations might be made by those skilled in the art without departing from the spirit and scope of the invention.

What is claimed is:

1. A method for processing queries in a search and retrieval system, said method comprising the steps of:

processing a query, which includes a plurality of query terms, to select, for said repository of documents, a plurality of documents relevant to said query terms;

identifying a plurality of topics for said documents selected, wherein said topics for a document identify subject matter contained within that document;

generating at least one grouping of said topics such that at least one document selected comprises subject matter for each topic in said grouping, and each topic in said grouping relates to a different query term; and displaying said groupings of said topics with said query terms so as to show, through display of a grouping of topics, how subject matter contained in said documents selected relates to said query terms.

2. The method as set forth in claim 1, further comprising the step of displaying a category, for one or more documents selected, with said grouping of topics, wherein said category indicates the primary subject matter for said documents selected.

3. The method as set forth in claim 2, wherein the step of displaying a category for one or more documents selected comprises the steps of:

classifying said documents in a category of a classification system; and displaying a category from said classification system for which said document is classified.

4. The method as set forth in claim 1, further comprising the step of displaying numbers with said grouping of topics displayed to indicate a number of documents identified.

5. The method as set forth in claim 1, wherein the step of displaying said grouping of topics with said query terms comprises the step of displaying theme groups as said grouping of topics, wherein a document, displayed with a corresponding theme group, includes thematic information for each theme in said theme group.

6. The method as set forth in claim 5, further comprising the steps of:

storing a plurality of themes for a plurality of documents, wherein said themes for a document define the overall content for said document;

selecting themes relevant to said query terms; and generating said theme groups from said themes selected, wherein said theme groups include themes common to all documents displayed with a corresponding theme group.

7. The method as set forth in claim 6, wherein the step of selecting themes relevant to said query terms comprises the steps of:

mapping said query terms to categories of a classification system;

selecting a plurality of documents classified in categories mapped for said query terms;

selecting themes for said documents selected; and selecting additional documents based on themes identified.

8. The method as set forth in claim 1, further comprising the step of displaying a plurality of groupings of topics in an order based on importance of said groupings of topics to said query.

9. The method as set forth in claim 1, wherein the step of displaying said groupings of topics comprises the step of displaying groupings of topics in an order based on the largest number of topics in a groupings of topics.

10. The method as set forth in claim 1, wherein the step of displaying said groupings of topics comprises the steps of:

displaying theme groups as said groupings of topics; and displaying said theme groups in an order based on the highest total theme weight of themes in a theme group.

11. The method as set forth in claim 1, wherein the step of displaying said groupings of topics comprises the step of displaying groupings of topics in an order based on document strength of documents displayed with a grouping of topics.

12. The method as set forth in claim 1, further comprising the step of displaying documents identified for a corresponding grouping of topics.

13. The method as set forth in claim 12, wherein the step of displaying documents comprises the steps of:

assigning theme weights to themes of a document; and displaying documents in an order based on a total theme weight assigned to themes in a document.

14. The method as set forth in claim 1, further comprising the step of displaying a relevancy system to indicate general relevancy of a grouping of topics to a query term.

15. A method for processing queries in a search and retrieval system, said method comprising the steps of:

storing a knowledge base that reflects organization of information for use in said search and retrieval system, said knowledge base comprising a plurality of terminology organized to reflect associations among said terminology;

processing a query, which includes a plurality of query terms, to identify terminology in said knowledge base relevant to at least one of said query terms;

identifying at least one grouping of said terminology such that each terminology in said group relates to a different query term; and displaying groupings of said query terms with said grouping of said terminology identified, so as to show, through display of said groupings of said terminology, how subject matter organized in said knowledge base relates to said query terms.

16. The method as set forth in claim 15, further comprising the steps of:

processing said query to identify an expanded set of query terms; and displaying groups of said expanded set of query terms corresponding to said query terms.

17. The method as set forth in claim 15, further comprising the steps of:

ranking said groupings of said terminology in order of relevance to said query terms; and displaying said groupings of said terminology from the most relevant grouping to the least relevant grouping.

18. The method as set forth in claim 17, wherein the step of displaying said groupings of said terminology comprises the step of displaying said groupings of said terminology in an order based on the highest number of query terms satisfied.

19. The method as set forth in claim 17, wherein the step of displaying said groupings of said terminology comprises the steps of:
   generating query term weights for each query term; and
   displaying said groupings of said terminology based on the highest total query term weight.

20. The method as set forth in claim 16, wherein the step of processing said query to identify an expanded set of query terms comprises the steps of:
   storing a knowledge base comprising a directed graph that links terminology having a lexical, semantic or usage association; and
   generating said expanded set of query terms by selecting terms that have a lexical, semantic or usage association with said query terms.

21. A method for processing queries in a search and retrieval system, said method comprising the steps of:
   classifying documents accessible to said search and retrieval system in one or more categories of a classification system;
   processing a query, which includes a plurality of query terms, to select documents that relate to said query terms;
   selecting categories for which said documents selected are classified;
   identifying at least one grouping of categories from said categories selected such that each category in said grouping relates to a different query term; and
   displaying said groupings of said categories with said query terms so as to show, through display of said categories, how subject matter contained in said documents relates to said query terms.

22. A computer readable medium comprising a plurality of instructions, which when executed by a computer, causes the computer to perform the steps of:
   processing a query, which includes a plurality of query terms, to select, for said repository of documents, a plurality of documents relevant to said query terms;
   identifying a plurality of topics for said documents selected, wherein said topics for a document identify subject matter contained within that document;
   generating at least one grouping of said topics such that at least one document selected comprises subject matter for each topic in said grouping, and each topic in said grouping relates to a different query term; and
   displaying said groupings of said topics with said query terms so as to show, through display of a grouping of topics, how subject matter contained in said documents selected relates to said query terms.

23. The computer readable medium as set forth in claim 22, further comprising instructions for displaying a category, for one or more documents selected, with said grouping of topics, wherein said category indicates the primary subject matter for a corresponding document.

24. The computer readable medium as set forth in claim 23, wherein the instructions for displaying a category for one or more documents selected comprise instructions for:
   classifying said documents in a category of a classification system; and
   displaying a category from said classification system for which said document is classified.

25. The computer readable medium as set forth in claim 22, further comprising instructions for displaying numbers with said grouping of topics displayed to indicate a number of documents identified.

26. The computer readable medium as set forth in claim 22, further comprising instructions for displaying a plurality of groupings of topics in an order based on importance of said groupings of topics to said query.

27. The computer readable medium as set forth in claim 26, wherein instructions for displaying said groupings of topics comprise instructions for displaying groupings of topics in an order based on the largest number of topics in a groupings of topics.

28. The computer readable medium as set forth in claim 26, wherein instructions for displaying said groupings of topics comprise instructions for:
   displaying theme groups as said groupings of topics; and
   displaying said theme groups in an order based on the highest total theme weight of themes in a theme group.

29. The computer readable medium as set forth in claim 26, wherein instructions for displaying said groupings of topics comprise instructions for displaying groupings of topics in an order based on document strength of documents displayed with a grouping of topics.

30. The computer readable medium as set forth in claim 22, further comprising instructions for displaying documents identified for a corresponding grouping of topics.

31. The computer readable medium as set forth in claim 30, wherein instructions for displaying documents comprise instructions for:
   assigning theme weights to themes of a document; and
   displaying documents in an order based on a total theme weight assigned to themes in a document.

32. The computer readable medium as set forth in claim 22, further comprising instructions for displaying a relevancy system to indicate general relevancy of a grouping of topics to a query term.

33. A computer readable medium comprising a plurality of instructions, which when executed by a computer, causes the computer to perform the steps of:
   storing a knowledge base that reflects organization of information for use in said search and retrieval system, said knowledge base comprising a plurality of terminology organized to reflect associations among said terminology;
   processing a query, which includes a plurality of query terms, to identify terminology in said knowledge base relevant to at least one of said query terms;
   identifying at least one grouping of said terminology such that each terminology in said group relates to a different query term; and
   displaying groupings of said query terms with said grouping of said terminology identified, so as to show, through display of said terminology, how subject matter organized in said knowledge base relates to said query terms.

34. The computer readable medium as set forth in claim 33, further comprising instructions for:
   processing said query to identify an expanded set of query terms; and
   displaying groups of said expanded set of query terms corresponding to said query terms.

35. The computer readable medium as set forth in claim 33, further comprising instructions for:
   ranking said groupings of said terminology in order of relevance to said query terms; and
   displaying said groupings of said terminology from the most relevant grouping to the least relevant grouping.

36. The computer readable medium as set forth in claim 35, wherein instructions for displaying said groupings of said terminology comprise instructions for displaying said groupings of said terminology in an order based on the highest number of query terms satisfied.

37. The computer readable medium as set forth in claim 35, wherein instructions for displaying said groupings of said terminology comprise instructions for:

generating query term weights for each query term; and displaying said groupings of said terminology based on the highest total query term weight.

38. The computer readable medium as set forth in claim 35, wherein instructions for displaying said groupings of said terminology comprise instructions for:

generating theme weights for each theme; and displaying said groupings of said terminology based on the highest total query term weight.

39. A computer system comprising:

input control device for receiving a user query that includes a plurality of query terms;

memory for storing a plurality of documents;

processor unit coupled to said input control device for processing said query, to select, for a repository of documents, a plurality of documents relevant to at least one of said query terms, for identifying a plurality of topics for said documents selected, wherein said topics for a document identify subject matter contained within that document, and for generating at least one grouping of said topics such that at least one document selected comprises subject matter for each topic in said grouping and each topic in said grouping relates to a different query term; and an output display coupled to said processor unit for displaying said grouping of topics with said query terms so as to show, through display of said topics, how subject matter contained in said documents relates to said query terms.

40. A computer readable medium comprising a plurality of instructions, which when executed by a computer, causes the computer to perform the steps of:

classifying documents accessible to said search and retrieval system in one or more categories of a classification system;

processing a query, which includes a plurality of query terms, to select documents that relate to said query terms;

selecting categories for which said documents selected are classified;

identifying at least one grouping of categories from said categories selected such that each category in said grouping relates to a different query term; and displaying said groupings of said categories with said query terms so as to show, through display of said categories, how subject matter contained in said documents relates to said query terms.

41. A computer system comprising:

input control device for receiving a user query that includes a plurality of query terms;

memory for storing a knowledge base that reflects organization of information for use in said search and retrieval system, said knowledge base comprising a plurality of terminology organized to reflect associations among said terminology;

processor unit coupled to said input control device and said memory for processing said query to identify terminology in said knowledge base relevant to at least one of said query terms, and to identify at least one grouping of said terminology such that each terminology in said group relates to a different query term; and an output display for displaying groupings of said query terms with said grouping of said terminology identified, so as to show, through display of said terminology, how subject matter organized in said knowledge base relates to said query terms.

42. A computer system comprising:

input control device for receiving a user query that includes a plurality of query terms;

memory for storing a plurality of themes for a plurality of documents in a repository of documents, wherein themes for a document identify subject matter contained within that document;

processor unit coupled to said input control device for processing said query, to identify, for a repository of documents, a plurality of documents relevant to at least one of said query terms, for identifying a plurality of themes for said documents selected, and for generating groupings of said themes such that each theme from said grouping of themes is relevant to one of said query terms; and an output display coupled to said processor unit for displaying said grouping of said themes with said query terms so as to show, through display of said themes, how subject matter contained in said documents relates to said query terms.

43. A computer system comprising:

input control device for receiving a user query that includes a plurality of query terms;

memory for storing a classification system that classifies documents accessible to said search and retrieval system in one or more categories;

processor unit coupled to said input control device and said memory for processing said query, to select documents that relate to said query terms, to select categories for which said documents selected are classified, and to identify at least one grouping of categories from said categories selected such that each category in said grouping relates to a different query term; and an output display coupled to said processor unit for displaying said groupings of said categories with said query terms so as to show, through display of said categories, how subject matter contained in said documents relates to said query terms.

* * * * *